US011847409B2

(12) United States Patent
Yu et al.

(10) Patent No.: US 11,847,409 B2
(45) Date of Patent: Dec. 19, 2023

(54) MANAGEMENT OF PRESENTATION CONTENT INCLUDING INTERJECTING LIVE FEEDS INTO PRESENTATION CONTENT

(71) Applicant: Microsoft Technology Licensing, LLC, Redmond, WA (US)

(72) Inventors: Lishan Yu, Cupertino, CA (US); Alexandre Gueniot, Mountain View, CA (US); Cameron Kikoen, Sunnyvale, CA (US); Bharath Ramanathan, San Jose, CA (US); Rajat Chamria, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/579,846

(22) Filed: Jan. 20, 2022

(65) Prior Publication Data
US 2022/0180052 A1 Jun. 9, 2022

Related U.S. Application Data

(63) Continuation of application No. 17/115,433, filed on Dec. 8, 2020, now Pat. No. 11,263,397.

(51) Int. Cl.
*G06F 40/186* (2020.01)
*G06F 40/169* (2020.01)
(Continued)

(52) U.S. Cl.
CPC .......... *G06F 40/186* (2020.01); *G06F 3/0483* (2013.01); *G06F 3/0484* (2013.01);
(Continued)

(58) Field of Classification Search
CPC .... G06F 3/0483; G06F 3/0484; G06F 40/186; G06F 40/169; G06N 3/04; G06T 13/80
See application file for complete search history.

(56) References Cited

U.S. PATENT DOCUMENTS

| 4,847,678 A | * | 7/1989 | McCauley | ............... H04N 9/45 348/537 |
| 8,831,505 B1 | * | 9/2014 | Seshadri | ................. G09B 5/06 434/351 |

(Continued)

OTHER PUBLICATIONS

VideoPoint, "Live Cameras in PowerPoint (webcams, IP cameras and streaming videos)", published: Apr. 17, 2020, presentationpoint.com, https://www.presentationpoint.com/blog/live-cameras-in-powerpoint/ (Year: 2020).*

(Continued)

*Primary Examiner* — Seth A Silverman

(57) ABSTRACT

The present disclosure relates to management of presentation content including technical instances where presentation content interacts with live feeds. The scope of the present disclosure covers technical examples that pertain to creation/design of presentation content as well technical examples where presentation content is presented in real-time (or near real-time). Design solutions are provided enabling users to easily interject a representation of a live camera feed into presentation content. For example, an editable GUI object is presented enabling users to incorporate a representation of a live camera feed into slide-based presentation content. The present disclosure further provides processing that fosters dynamic management of presentation content including interactions with live camera feeds during a presentation. Furthermore, an improved GUI presents GUI elements and notifications to aid management of representations of live camera feeds relative to presentation content.

(Continued)

Live camera feeds can be dynamically added within a slide-based presentation during real-time presentation.

20 Claims, 13 Drawing Sheets

(51) Int. Cl.
    *G06F 3/0483*     (2013.01)
    *G06F 3/0484*     (2022.01)
    *G06N 3/04*     (2023.01)
    *G06T 13/80*     (2011.01)

(52) U.S. Cl.
    CPC ............. *G06F 40/169* (2020.01); *G06N 3/04* (2013.01); *G06T 13/80* (2013.01)

(56) References Cited

U.S. PATENT DOCUMENTS

| | | | |
|---|---|---|---|
| 9,674,243 | B2 | 6/2017 | Bader-natal et al. |
| 10,986,301 | B1 | 4/2021 | Schanz |
| 11,263,397 | B1* | 3/2022 | Yu ........................ G06F 3/0483 |
| 11,265,181 | B1 | 3/2022 | Springer |
| 2005/0160368 | A1* | 7/2005 | Liu ..................... G06F 3/04847 715/764 |
| 2007/0081075 | A1* | 4/2007 | Canova .................. H04N 7/152 348/14.09 |
| 2010/0031152 | A1 | 2/2010 | Villaron et al. |
| 2010/0037151 | A1* | 2/2010 | Ackerman ............. G06Q 10/10 715/753 |
| 2011/0109751 | A1* | 5/2011 | Chang ................ H04N 5/23206 348/207.1 |
| 2012/0023407 | A1 | 1/2012 | Taylor |
| 2012/0113095 | A1 | 5/2012 | Hwang et al. |
| 2012/0206577 | A1* | 8/2012 | Guckenberger ..... G09B 19/003 348/47 |
| 2012/0310750 | A1* | 12/2012 | Schutzbank ........... G06Q 30/02 705/14.72 |
| 2013/0215292 | A1 | 8/2013 | Reichelt |
| 2014/0072945 | A1* | 3/2014 | Gu .......................... G09B 5/12 434/350 |
| 2014/0184721 | A1 | 7/2014 | Zhang et al. |
| 2014/0232814 | A1 | 8/2014 | Malhotra et al. |
| 2014/0362165 | A1* | 12/2014 | Ackerman .......... H04L 65/4046 348/14.07 |
| 2015/0058754 | A1* | 2/2015 | Rauh ..................... H04L 65/403 715/753 |
| 2015/0121189 | A1 | 4/2015 | Titterington et al. |
| 2015/0350269 | A1 | 12/2015 | Shibata |
| 2017/0039867 | A1 | 2/2017 | Fieldman |
| 2017/0237986 | A1 | 8/2017 | Choi et al. |
| 2018/0160076 | A1 | 6/2018 | Ozaki |
| 2018/0239504 | A1* | 8/2018 | Huang .................. G06F 3/0483 |
| 2019/0088153 | A1 | 3/2019 | Bader-natal et al. |
| 2019/0205962 | A1* | 7/2019 | Piramuthu ......... G06Q 30/0627 |
| 2020/0081606 | A1 | 3/2020 | Mo et al. |
| 2020/0126437 | A1 | 4/2020 | Fieldman |
| 2020/0137316 | A1* | 4/2020 | Zavesky ................ H04N 7/147 |
| 2020/0371647 | A1* | 11/2020 | Gerges .................. G06F 3/0482 |
| 2020/0388060 | A1 | 12/2020 | Rimon |
| 2020/0412780 | A1 | 12/2020 | Devendran et al. |
| 2021/0273892 | A1* | 9/2021 | Rakshit ................. G06F 16/953 |
| 2022/0086200 | A1 | 3/2022 | Lansing et al. |
| 2022/0121354 | A1 | 4/2022 | Xia |
| 2022/0180052 | A1* | 6/2022 | Yu ......................... G06F 40/169 |
| 2022/0374590 | A1 | 11/2022 | Seth et al. |
| 2023/0066504 | A1 | 3/2023 | Daha et al. |

OTHER PUBLICATIONS

"International Search Report and Written Opinion Issued in PCT Application No. PCT/US21/058870", dated Feb. 23, 2022, 13 Pages.
"TouchCastApp. "Introducing TouchCast"", Retrieved from: https://www.youtube.com/watch?v=uyLK8N4ovdg, Jun. 27, 2013, 3 Pages.
"Non Final Office Action Issued in U.S. Appl. No. 17/323,618", dated Jul. 20, 2022, 18 Pages.
"International Search Report and Written Opinion Issued in PCT Application No. PCT/US22/026246", dated Aug. 3, 2022, 12 Pages.
"International Search Report and Written Opinion Issued in PCT Application No. PCT/US22/036066", dated Oct. 5, 2022, 14 Pages.
"Final Office Action Issued in U.S. Appl. No. 17/323,618", dated Jan. 20, 2023, 17 Pages.
"Non Final Office Action Issued in U.S. Appl. No. 17/458,003", dated Apr. 12, 2023, 16 Pages.
"Notice of Allowance Issued in U.S. Appl. No. 17/323,618", dated Jun. 2, 2023, 22 Pages.
Williams, Karen, "PowerPoint Tip—Adding a Whiteboard to your Presentation", Retrieved From: https://www.microassist.com/software-tips/powerpoint-tip-adding-a-whiteboard-to-your-presentation/, Oct. 1, 2015, 2 Pages.
"Notice of Allowance Issued in U.S. Appl. No. 17/323,618", dated Jul. 24, 2023, 5 Pages.
"Final Office Action Issued in U.S. Appl. No. 17/458,003", dated Oct. 24, 2023, 15 Pages.

* cited by examiner

100

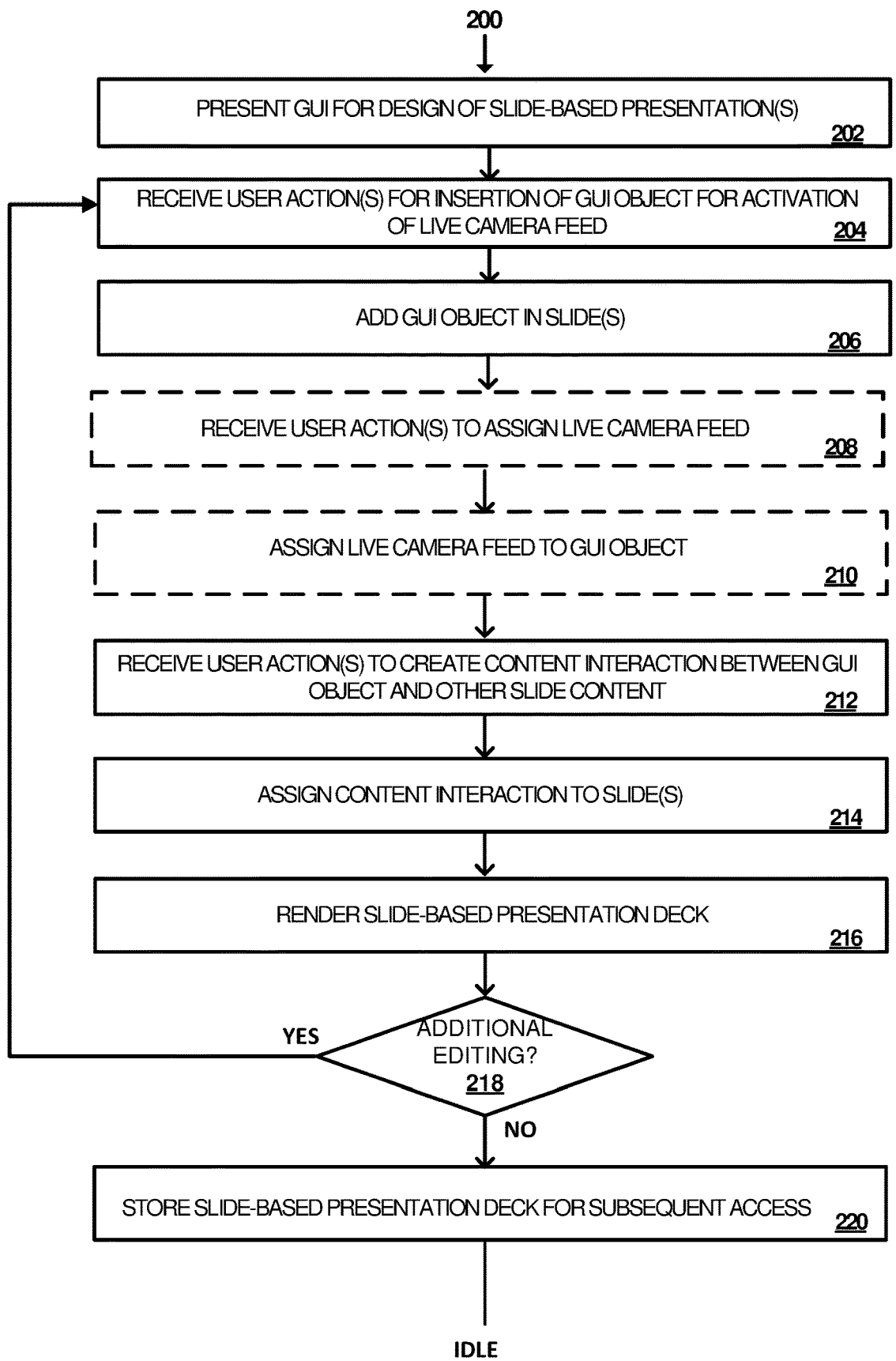

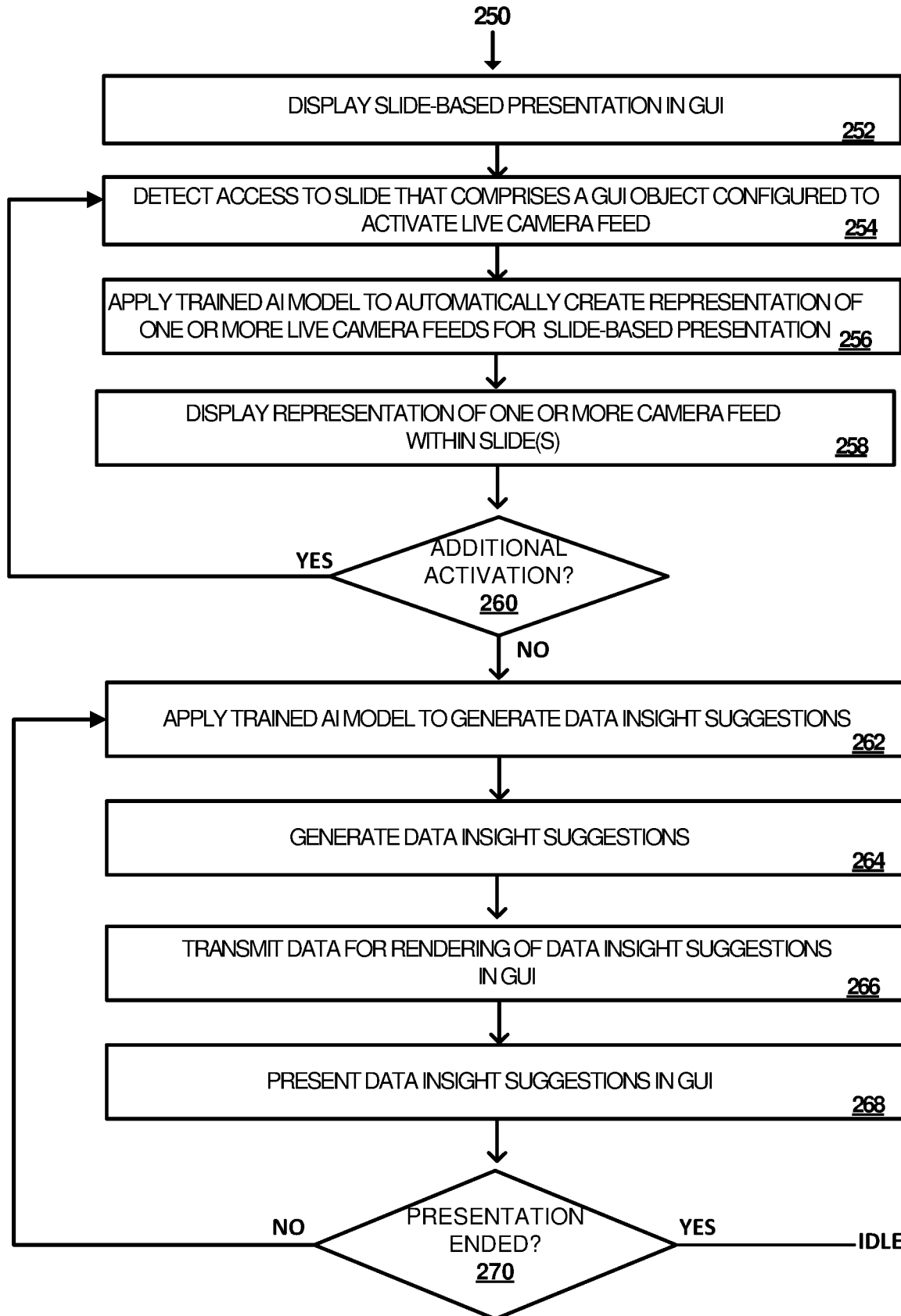

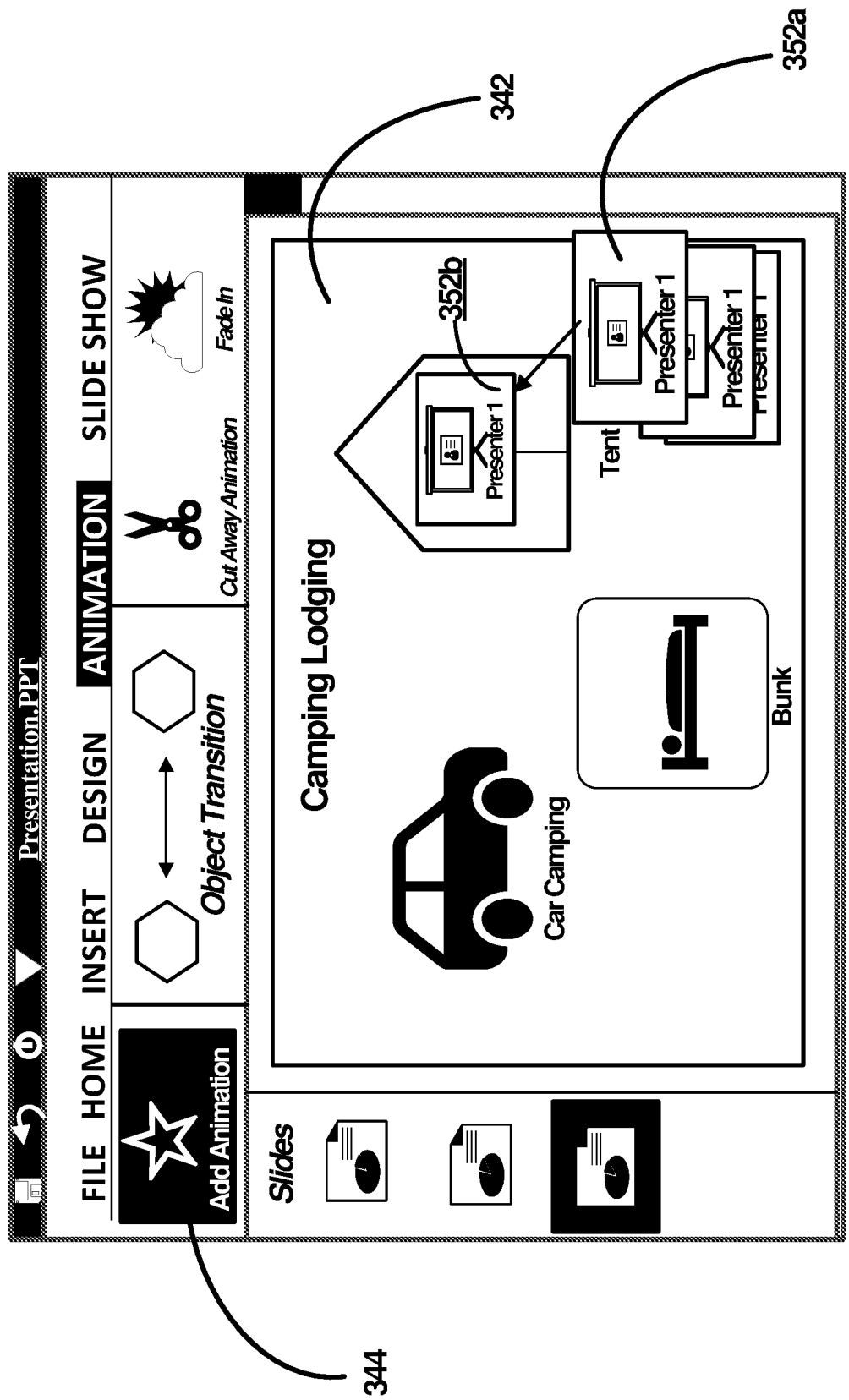

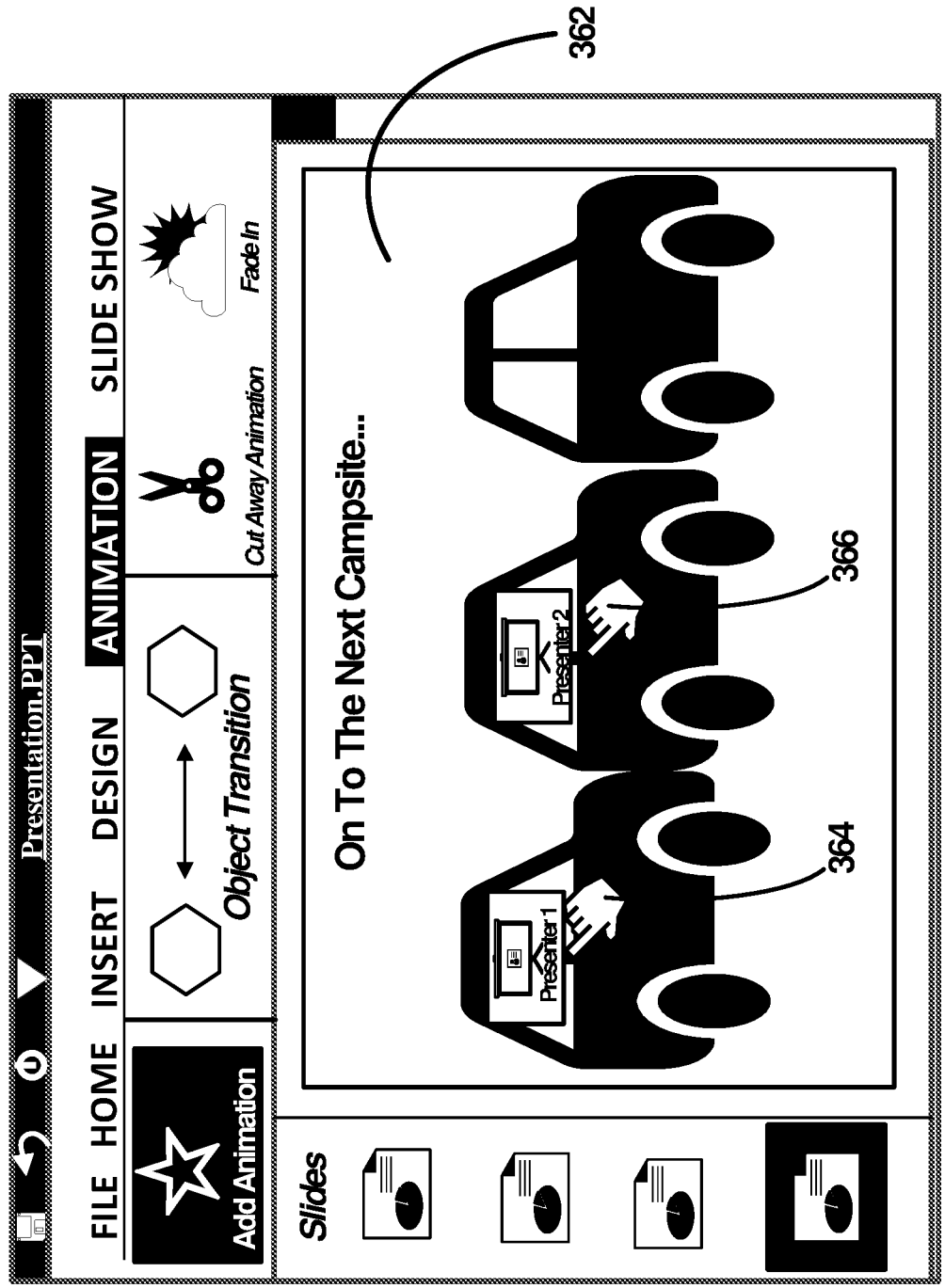

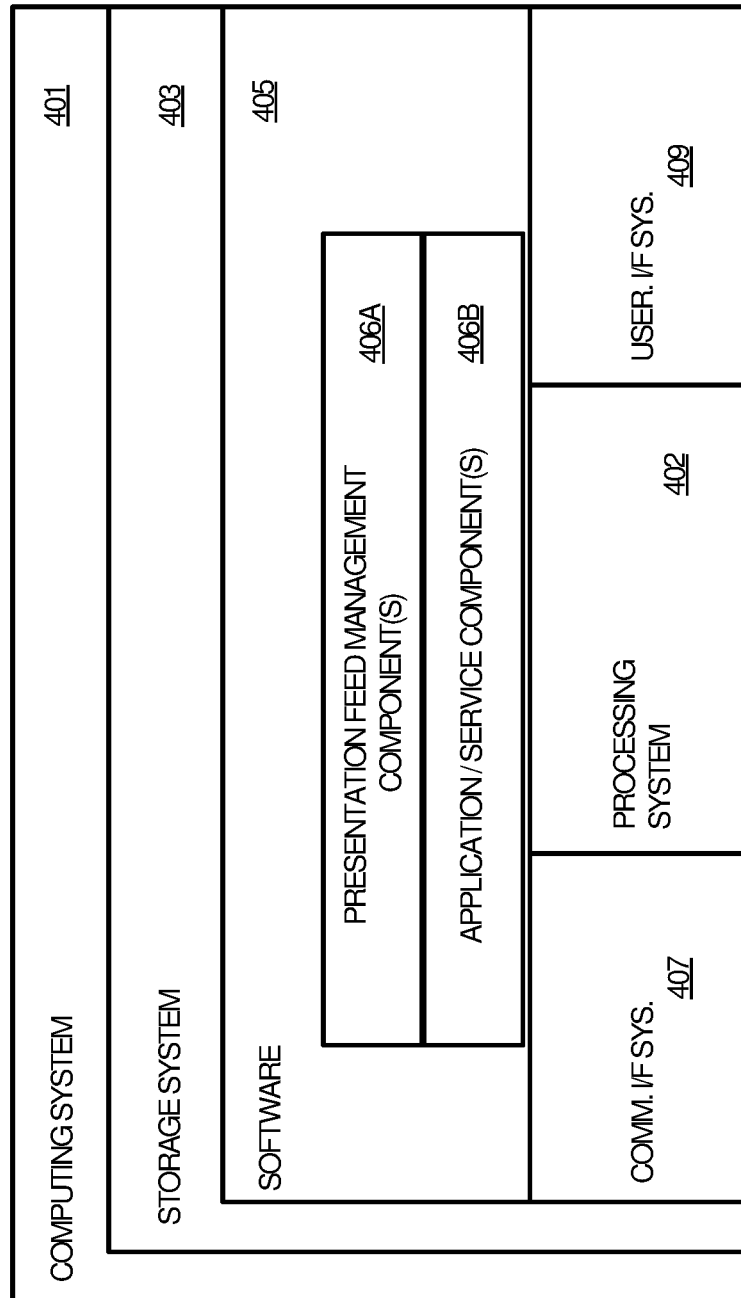

MANAGEMENT OF PRESENTATION CONTENT INCLUDING INTERJECTING LIVE FEEDS INTO PRESENTATION CONTENT

PRIORITY

This patent application is a continuation of and claims priority to U.S. patent application Ser. No. 17/115,433, filed on Dec. 8, 2020, entitled "MANAGEMENT OF PRESENTATION CONTENT INCLUDING INTERJECTING LIVE FEEDS INTO PRESENTATION CONTENT" and hereby incorporated by reference into this patent application.

BACKGROUND

With the recent surge in remote collaboration, remote meetings have become commonplace for connecting users. In many remote meetings, users are presenting content for other users to follow along with. This configuration can present technical challenges as a video feed of a presenter is often separate from the presentation content that is being discussed during a presentation. For instance, presentation content such as slides may take up most of a viewable display space during a remote meeting while a video feed of a presenter is usually represented in only a tiny fraction of that allocated display space.

In the above described technical scenario, presenters may struggle with managing whether other participants should focus on a presenter feed or the presentation content being presented in a different graphical user interface (GUI) window. Presenters may also struggle in technical examples where presentation content spans multiple documents (and/or multiple computing devices), as they would need to keep switching between documents/devices to enable other participants to follow along with the presentation. This issue is further exemplified in instances where there are multiple presenters for participants to follow.

Audience members in a remote meeting may also struggle when determining where to focus their attention between a presenter feed or another content window. Additionally, audience members may further struggle with a recollection of presentation content, especially in technical instances where multiple different presenters were presenting and/or presentation content spanned multiple different documents. In some cases, missing even a sentence of what a presenter may have said can cause an audience member to miss the point a presenter is trying to convey. For instance, a participant may be reading a specific content of a slide and completely miss a critical explanation of that slide. This can even occur in instances where there are technical difficulties (i.e., connection issues).

Moreover, context of a presentation (e.g., a remote meeting) can change in an instant. Computing resources may be assigned to monitor a context of a communication. However, such computing resources are not typically used to manage interactions between video feeds and presented content, especially in instances where a focus of a video feed changes relative to content being presented. It stands that computing devices used for contextual monitoring can be configured to operate more efficiently to help improve monitoring of user communications such as presentations, remote meetings, etc.

SUMMARY

For resolution of the above technical problems and other reasons, there is a technical need for the present disclosure that relates to management of presentation content including technical instances where presentation content interacts with live feeds. While examples of the present disclosure may reference live camera feeds (as live feeds), it is to be recognized that processing operations described in the present disclosure is intended to be applicable to other types of live feeds (e.g., audio input/output and/or video input/output). The scope of the present disclosure covers technical examples that pertain to creation/design of presentation content as well technical examples where presentation content is presented in real-time (or near real-time). In one example, the present disclosure provides design solutions enabling users to easily interject a representation of a live camera feed into presentation content. For example, an editable GUI object is presented enabling users to incorporate a representation of a live camera feed into slide-based presentation content. The present disclosure further provides processing that fosters dynamic management of presentation content including interactions with live camera feeds during a presentation. Furthermore, an improved GUI is also described that present GUI elements and notifications to aid management of representations of live camera feeds relative to presentation content. For instance, live camera feeds can be dynamically added within a slide-based presentation during real-time presentation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2A illustrates an exemplary method related to management of a GUI element that is configured to activate a live camera feed within a slide-based presentation, with which aspects of the present disclosure may be practiced.

FIG. 2B illustrates an exemplary method related to management of activation of live camera feeds within a slide-based presentation, with which aspects of the present disclosure may be practiced.

FIGS. 3A-3I illustrate exemplary processing device views associated with user interface examples for an improved user interface that is configured enable management of live feeds within slide-based presentations, with which aspects of the present disclosure may be practiced.

FIG. 4 illustrates a computing system suitable for implementing processing operations described herein related to management of live feeds within slide-based presentations, with which aspects of the present disclosure may be practiced.

DETAILED DESCRIPTION

Figure 1:
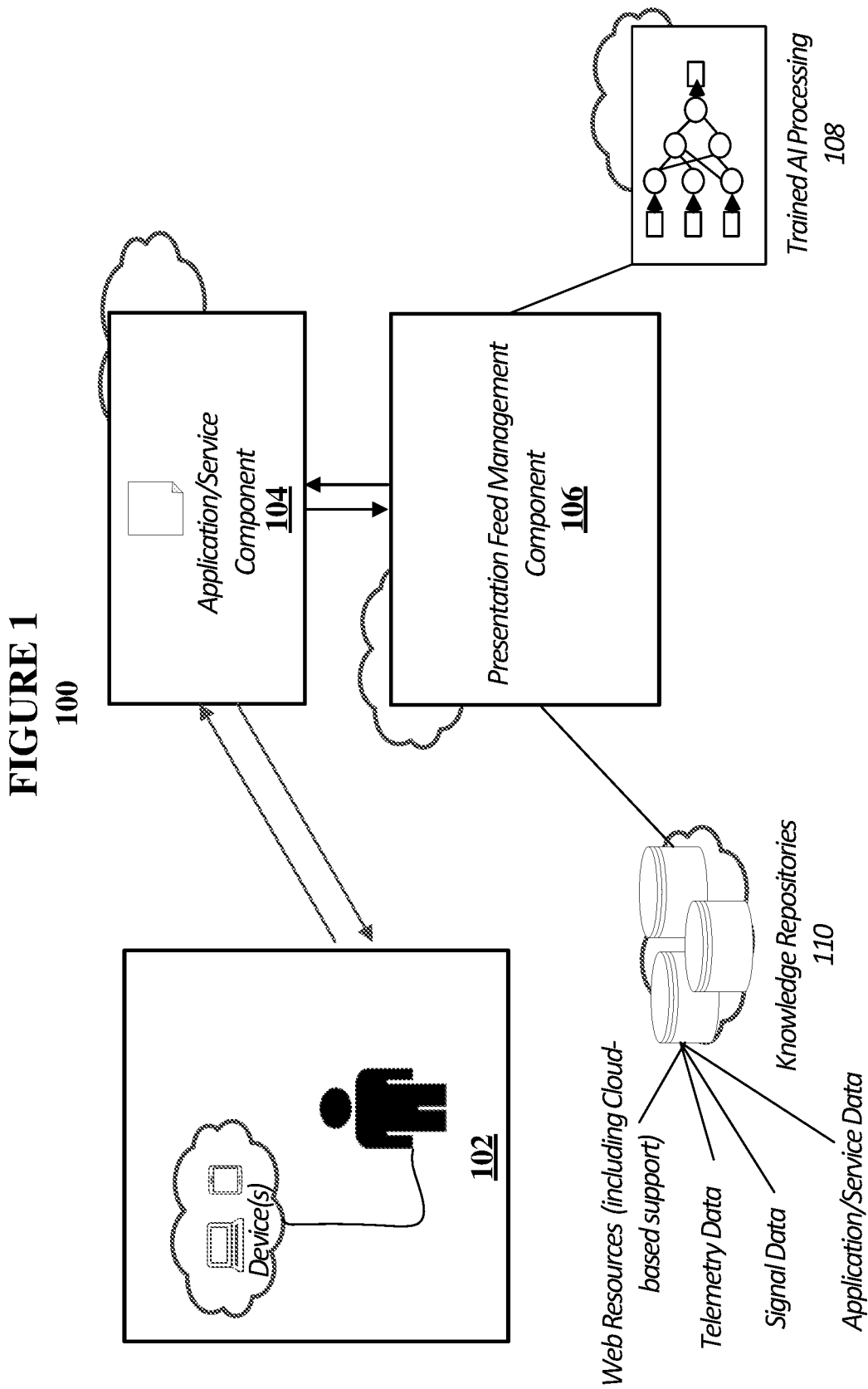
FIG. 1 illustrates an exemplary system diagram of components interfacing to enable management of live feeds within slide-based presentations, with which aspects of the present disclosure may be practiced.

As identified in the foregoing, the present disclosure relates to systems and methods configured for management of presentation content including technical instances where presentation content interacts with live feeds. For ease of explanation, a live camera feed may be used in this detailed description to represent a live feed. While examples of the present disclosure may reference live camera feeds (as live feeds), it is to be recognized that processing operations described in the present disclosure is intended to be applicable to other types of live feeds (e.g., audio input/output and/or video input/output). For instance, in an example where audio-only feeds are incorporated in presentation content, a visual placeholder may still be representative of the audio-only feed within the presentation content. In some technical instances, live feed may be represented by a dynamic visual representation that is reflective of a state of a live feed.

The scope of the present disclosure covers technical examples that pertain to creation/design of presentation content as well technical examples where presentation content is presented in real-time (or near real-time). In one example, the present disclosure provides design solutions enabling users to easily interject a representation of a live camera feed into presentation content. For example, an editable GUI object is presented enabling users to incorporate a representation of a live camera feed into slide-based presentation content. The present disclosure further provides processing that fosters dynamic management of presentation content including interactions with live camera feeds during a presentation. Furthermore, an improved GUI is also described that present GUI elements and notifications to aid management of representations of live camera feeds relative to presentation content. For instance, live camera feeds can be dynamically added within a slide-based presentation during real-time presentation.

Presentation content is intended to cover any example where one or more content portions are inserted and arranged within a digital document or electronic file for presentation purposes. It is to be recognized that utility of the present disclosure extends to working with any type of electronic files or digital documents in which a live feed may be configurable as an inserted or embedded content portion. Types of electronic files and digital documents are known to one skilled in the field of art. As non-limiting examples, digital documents comprise but are not limited to: word processing documents; spreadsheet documents; notes documents; webpages; presentation documents (e.g., presentation slide, open canvas template); illustration documents (e.g., artboards, flowcharts, drawing documents); recording/editing documents (e.g., video or audio); messaging/email documents; and social networking objects (e.g., posts). For ease of explanation, reference is made to slide-based content as presentation content. Slide-based content is intended to cover any example (e.g. linear or nonlinear) where one or more content portions are inserted and arranged within one or more templatized canvases, which are viewable as (or convertible to) a presentation document. In one example, slide-based content is a linear representation (e.g., presentation slide provided through a presentation application/service such as POWERPOINT®). For example, a representation of a live camera feed is embedded as content within a slide of a slide-based presentation. Another example of slide-based content is a nonlinear representation where an open canvas template is provided and manipulated (e.g., via zooming) to present content portions thereof. For example, a portion of an open canvas template can be zoomed-in on to provide a fractional representation of the open canvas template. The present disclosure further extends to technical instances where presentation content is created in one application or service and is presented in another application or service as part of a collaborative user communication (e.g., electronic meeting). For example, a user may create a slide-based presentation in a presentation application or service (e.g., POWERPOINT®) and subsequently present that slide-based presentation as part of an electronic meeting conducted in a collaborative communication application or service (e.g., MICROSOFT® TEAMS®).

An improved GUI of the present disclosure provides users with control over presentation content creation, where users can stitch their live camera feeds into any type of presentation content, and that presentation content can then be distributed to other users (e.g., audience members) for discussion in via user communication (e.g., an electronic meeting). A live camera feed as described herein is intended to cover any example where one or more content streams, including a video stream, are presented over an electronic medium. For example, a live camera feed covers technical instances where one or more data streams (e.g., including a live video stream) are broadcast (e.g., over a network connection) and/or provided as output through a computing device and/or computer program. An exemplary live camera feed is intended to distinguish from technical instances where video is recreated from static images, where the latter would require significant technical modification, above what is traditionally known, to integrate a feed into a slide-based presentation in the manner described in the present disclosure. For instance, processing of static images would limit the ability to apply content interactions between exemplary GUI objects and other slide content making resulting interactions not appear seamless on the front-end (i.e., GUI) and ultimately be less efficient from a processing standpoint on the back-end. In some examples, a live camera feed of present disclosure also processes additional data types (e.g., audio data) as a stream (e.g., audio stream) to cohesively represent a presentation state of a user and/or computing device. Processing for rendering and presenting live streams and types of data streams that may be included in a live camera feed are known to one skilled in the field of art.

Above what is traditionally, known the present disclosure describes novel processing for working with live camera feeds including ways in which they are integrated within presentation content (e.g., a slide-based presentation). Further improvements over traditional systems are reflected through contextual analysis of presentation content and adaptation of live camera feeds for presentation content, where a representation of a live camera feed can be generated and displayed. A representation of a live camera feed is intended to cover examples where a live camera feed is presented relative to a configuration of an exemplary GUI object (e.g., the content of live camera stream is unedited but the size/formatting is modified relative to the attributes of a GUI object) as well as technical instances where an edited live camera feed is rendered and presented. An edited live camera feed is a representation of a live camera feed where additional processing operations have been applied to modify a stream (e.g., live video stream) of a live camera feed from its original presentation state to a state that is specifically tailored to fit presentation content. In any example, a representation of a live camera feed is made part of the presentation content (e.g., a slide of a slide-based presentation), where the user can edit a GUI object for the live camera feed as it would other types of content objects of a slide-based presentation. For example, a novel GUI object, configured to active a live camera feed during a presentation, is editable where users can directly apply thereto any of: object formatting options, modification of layouts and styles, animations, etc., as well as modify the GUI object to assign specific user accounts and/or computing devices as a subject of the live camera feed. A GUI object of the present disclosure is utilized to automatically activate a representation of a live camera feed from any users (e.g., presenters, audience members) and/or any devices (e.g., different computing devices of presenters providing different content) and present that live camera feed as part of presentation content. Moreover, the present disclosure allows multiple live camera feeds from different presenters to appear on the same slide and/or on different slides in a slide-based presentation deck.

In one non-limiting example, a presentation feed management component is configured to manage user interactions with a presentation application or service to aid creation/design of a slide-based presentation. For example, a first user action may be received through a GUI of a presentation application/service that selects a GUI object, configured to activate a live camera feed, and places the GUI object within a slide template of a slide-based presentation deck (e.g., representation of slide-based content). In response to receiving the first user action, an exemplary GUI object is added to the slide template. As identified in the foregoing, the GUI object is an editable content portion within the slide template. In some further examples, a second user action is received that creates a content interaction between the GUI object and another content portion of the slide template. In response to receiving the second user action, a content interaction is assigned to the slide template. The slide-based presentation deck may then be rendered for presentation, where presentation of a slide associated with the slide-based template automatically activates the live camera feed and the content interaction.

As previously indicated, an exemplary GUI object uniquely presents a representation of a live camera feed that is editable as a content object within a slide of a slide-based presentation. In some examples, a GUI object may be configured to activate a live camera feed for a specific user account and/or specific computing device (e.g., associated with a user account). A GUI of presentation application or service makes it easy to correlate a user (or computing device) with a live camera feed by automatically providing identifying designations for live camera feeds during a presentation/user communication (e.g., presenter 1, presenter 2, audience member 1, audience members, specific user accounts of a distributed software platform, specific computing devices). In some technical instances, trained AI processing may be applied that is configured to automatically provide contextually relevant designations for live camera feed (e.g., specific user accounts or identification of specific computing devices) within a GUI menu that lists selectable GUI object options for which a user can insert into a slide-based template. For instance, a context associated with presentation content may be analyzed to identify relevant team members of a user or other users who commonly present with a user (or present on specific presentation content). In other examples, specific computing devices associated with a user (e.g., user smart phone, user laptop, etc.) may be identified in a listing of selectable GUI options. In further examples, a GUI object may be modifiable after the insertion a GUI object into a slide-based template, where a user can manually associate that GUI object with a specific user account (e.g., of a distributed software platform) or a specific live camera feed designation (e.g., presenter, audience) that may be specific to an application or service that is hosting a presentation (e.g., electronic meeting). In other instances, the GUI object, inserted in the slide-based template, is modifiable after insertion to associate the GUI object with a specific computing device (e.g., of one or more presenters).

In further examples, trained AI processing is applied to enhance creation/design of presentation content. For instance, one or more trained AI models may be applied to aid modification and/or insertion of an exemplary GUI object within presentation content (e.g., a slide-based presentation). This may comprise automated generation of determinations and/or data insight suggestions that can be used for any of the following: to suggest a specific live camera feed to associate with a GUI object; to suggest a placement position of an exemplary GUI object within presentation content (e.g., relative to other content portions of the slide-based template); to suggest a content interaction between a GUI object one or more other content portions (content objects) of specific presentation content; and to automatically effect a content interaction between a GUI object and one or more other content portions of presentation content, among other examples. In one example, a GUI object may be inserted into presentation content by a user, where a notification of a data insight suggestion may be presented in a GUI for the user to help the user select a content interaction (e.g., animation) to apply. For instance, analysis of content of a slide-based template may yield a suggestion to create an animation between the GUI object and one or more other content portions of a slide-based template. In further examples, a trained AI model is configured to automatically apply a content interaction on behalf of a user based on a result of analysis of the GUI object relative to other content portions of a slide-based template.

In other non-limiting examples, a presentation feed management component is configured to dynamic manage presentation content including interactions with live camera feeds during a presentation that is being conducted in real-time (or near real-time). For instance, a slide-based presentation may be presented in a GUI of an application or service. As referenced in the foregoing, non-limiting examples of applications/services may comprise: a presentation application or service, and a collaborative communication application or service that is being used to conduct an electronic meeting.

The presentation feed management component may be configured to detect access to a slide-based presentation (e.g., a displayed slide), that comprises, within a displayed slide, a GUI object configured to activate a live camera feed. This may trigger application of a trained AI model that is configured to automatically create a representation of a live camera feed (or an edited live camera feed). An exemplary representation of a live camera feed may comprise one or more edited live camera feeds, from representations of live camera feeds, that are tailored for the slide-based presentation. In some examples, a trained AI model is configured to activate a live camera feed (as displayed through an application/service) and present an unedited live stream of that live camera feed at a location of a GUI object within a displayed slide. In further examples, a trained AI model may be utilized to generate an edited live camera that modifies the live camera feed for presentation within a displayed slide. In doing so, the trained AI model is configured to execute processing operations that comprise one or more of: generating an edited live camera feed for the live camera feed by removing a background associated with the live camera feed; analyzing slide content portions of a slide and/or associated slide content interactions; and automatically formatting the edited live camera feed to fit within a slide based on a result of analyzing the slide content portions and/or the slide content interactions. The edited live camera feed is then displayed within the slide based on a result of the automatically formatting of the edited live camera feed by the trained AI model. In some examples, multiple edited live camera feeds may be displayed in a specific slide and/or slide-based presentation deck.

In further examples, trained AI processing is applied to enhance contextual evaluation of a presentation and associated presentation content. For instance, one or more trained AI models may also be applied to aid generation of data insight suggestions for managing representations of live camera feeds relative to presentation content. In execution, a trained AI model may be configured to analyze signal data (e.g., user-specific, device-specific and/or application-specific) associated with a presentation and generate data insight suggestions related to management of live camera feeds during a presentation (e.g., electronic meeting). This may comprise automated generation of data insight suggestions that can be used to recommend inclusion of live camera feeds in a slide-based presentation (e.g., slides thereof). Non-limiting examples of data insight suggestions that may be automatically provided for a user are illustrated in FIGS. 3F-3I and explained in the accompanying description.

Exemplary technical advantages provided by processing described in the present disclosure comprise but are not limited to: generation of GUI objects configured to active live feeds within presentation content (e.g., slide-based presentations); ability to generate novel representations of live camera feeds including editing a live camera feed to tailor a live camera feed for content of a specific slide; ability to create content interactions between exemplary GUI objects and other content portions of a slide-based presentation; ability to include representations of multiple live camera feeds within presentation content (e.g., a single slide or multiple different slides of a slide-based presentation); application of trained AI processing to improve creation of presentation content including (suggestions for) insertion of live camera feeds in presentation content; application of trained AI processing to improve rendering of live camera feeds (e.g., creation of edited lie camera feeds) within presentation content; application of trained AI processing to dynamically evaluate a presentation and provide suggestions (e.g., data insight suggestions) for updating representations of live camera feeds relative to presentation content; automatic activation of live camera feeds within presentation content during a live presentation; ability to store and recall presentation content that includes live camera feeds; an improved GUI provided through an application or service that is configured to manage states associated with live camera feeds; improved quality in the level of data insights provided during a live presentation; improved processing efficiency (e.g., reduction in processing cycles, saving resources/bandwidth) for computing devices when integrated live camera feeds within presentation content; reduction in latency when activating live camera feeds within presentation content; and interoperability to enable components described herein to interface with any type of application/service and any type of presentation content (e.g., different types of digital documents), among other technical advantages.

FIG. 1 illustrates an exemplary system diagram 100 of components interfacing to enable management of live feeds within slide-based presentations, with which aspects of the present disclosure may be practiced. As an example, components illustrated in system diagram 100 may be executed by an exemplary computing system 401 (or multiple computing systems) as described in the description of FIG. 4. System diagram 100 describes components that may be utilized to execute processing operations described in methods 200 (FIG. 2A) and 250 (FIG. 2B) as well as processing described in and associated with visual diagrams of FIGS. 3A-3I and the accompanying description. Moreover, interactions between components of system diagram 100 may be altered without departing from the spirit of the present disclosure. Exemplary components, described in system diagram 100, may be hardware and/or software components, which are programmed to execute processing operations described herein. In some examples, components of system diagram 100 may each be one or more computing devices associated with execution of a specific service. Exemplary services may be managed by a software data platform (e.g., distributed software platform) that also provides, to a component, access to and knowledge of other components that are associated with applications/services. In one instance, processing operations described in system diagram 100 may be implemented by one or more components connected over a distributed network, where a user account may be working with a specific profile established through a distributed software platform. System diagram 100 comprises user computing devices 102; an application/service component 104; a presentation feed management component 106; a component for implementation of trained AI processing 108; and knowledge repositories 110.

System diagram 100 comprises user computing device(s) 102. An example of a user computing device 102 is a computing system (or computing systems) as described in the description of FIG. 4. User computing device(s) 102 are intended to cover examples where a computing device is a client computing device that is executing an application or service configured to enable generation of presentation content and/or conducting of a presentation of presentation content. In one example, a user may be utilizing a presentation application or service to create/design presentation content or even execute a presentation of presentation content (e.g., in a trial/rehearsal run or as a live presentation). In another example, a user may be conducting an electronic meeting through a collaborative communication application or service, where a GUI is provided for the electronic meeting including a GUI window enabling a user to present presentation content (e.g., displayed using a presentation application or service) within a GUI of a collaborative communication application or service. Presentation content in intended to cover any type of electronic document in which content is intended to be presented (or reviewed) to other users. An electronic document (or electronic file) is a representation of authored content in an electronic media/electronic format such as a digital file. Examples of electronic documents may vary, where files may be created to work with any type of application/service and in any type of file format as known to one skilled in the field of art. For instance, an electronic document may be created for: a presentation application or service (e.g., slide-based presentation application or service such as POWERPOINT®); a collaborative communication application or service (e.g., MICROSOFT® TEAMS®); a word processing application or service, a notetaking application or service; a spreadsheet application or service; an illustration (or diagramming) application or service; and a web application or service, among other examples. Electronic documents may be accessed natively, through applications stored on the user computing device. In alternate examples, electronic documents may be accessed over a network connection such as in the following non-limiting examples: an electronic document is a web page accessed through a web browser; and an electronic document a distributed copy of a file that is being accessed but is remotely stored on a data storage (e.g., distributed data storage) other than the computing device 102 that is being used to access content. Electronic documents may also include message content examples such as email messages, instant text messages and social media postings, among other examples.

Furthermore, user computing device(s) 102 may be specifically configured to enable users to provide live camera feeds during a presentation of presentation content. User computing device(s) 102 may comprise components such as a video camera (e.g., webcam) and a microphone, which may be utilized to establish a live camera feed through an application or service. As referenced in the foregoing, a live camera feed as described herein is intended to cover any example where one or more content streams, including a video stream, are presented over an electronic medium. For example, a live camera feed covers technical instances where one or more data streams (e.g., including a live video stream) are broadcast (e.g., over a network connection) and/or provided as output through a computing device and/or computer program. An exemplary live camera feed is intended to distinguish from technical instances where video is recreated from static images, where the latter would require significant technical modification, above what is traditionally known, to integrate a feed into a slide-based presentation in the manner described in the present disclosure. For instance, processing of static images would limit the ability to apply content interactions between exemplary GUI objects and other slide content making resulting interactions not appear seamless on the front-end (i.e., GUI) and ultimately be less efficient from a processing standpoint on the back-end. In some examples, a live camera feed of present disclosure also processes additional data types (e.g., audio data) as a stream (e.g., audio stream) to cohesively represent a presentation state of a user and/or computing device. Processing for rendering and presenting live streams and types of data streams that may be included in a live camera feed are known to one skilled in the field of art.

Above what is traditionally, known the present disclosure describes novel processing for working with live camera feeds including ways in which they are integrated within presentation content (e.g., a slide-based presentation). Further improvements over traditional systems are reflected through contextual analysis of presentation content and adaptation of live camera feeds for presentation content. An exemplary live camera feed is made part of the presentation content (e.g., a slide of a slide-based presentation), where the user can edit a GUI object for the live camera feed as it would other types of content objects of a slide-based presentation. For example, a novel GUI object, configured to active a live camera feed during a presentation, is editable where users can directly apply thereto any of: object formatting options, modification of layouts and styles, animations, etc., as well as modify the GUI object to assign specific user accounts and/or computing devices as a subject of the live camera feed. A GUI object of the present disclosure is utilized to automatically activate a live camera feed from any users (e.g., presenters, audience members) and/or any devices (e.g., different computing devices of presenters providing different content) and present that live camera feed as part of presentation content. Moreover, the present disclosure allows multiple live camera feeds from different presenters to appear on the same slide and/or on different slides in a slide-based presentation deck.

An application/service component 104 may be configured to establish a live camera feed during a presentation such as an electronic meeting through interfacing with a user computing device 102. For example, a collaborative communication application or service, that is used to establish an electronic meeting, may detect components (e.g., webcam and microphone) of a user computing device 102 and automatically establish a connection thereto to enable a live camera feed to be presented for the electronic meeting. Further, the presentation feed management component 106 is configured to interface with the application/service component 104 to identify streams associated with live camera feeds of participants in a presentation such as a user communication. A user communication is a technical instance where at least one user is involved in a conversation. Examples of user communications are known to one skilled in the field of art. For reference, some technical instances of user communications comprise collaborative communications between multiple users such as electronic meetings or a conversation over an electronic medium (e.g., messaging, email, channel of a collaborative application/service). Additional examples of user communications may also extend to instances where a user is conducting a conversation with a software application/service (e.g., one that provides a chatbot) that simulates dialogue of a conversation or other examples where one or more users are providing dialogue such as a training run of a presentation being recorded through a presentation application/service or the like.

An exemplary application/service component 104 is configured to provide data for an exemplary application/service. The designation application/service is intended to cover any examples where an application or service is provided. Applications or services, provided through the application/service component 104, may be any type of programmed software. Examples described herein are intended to work with any type of productivity application or service. A productivity application or service is configured for execution of tasks including the management of user communications. In some examples, productivity applications/services may be utilized to enable users to conduct presentation of content, for example, through a user communication. In other examples, productivity applications/services may be utilized to enable users to create/design presentation content such as slide-based presentation decks that comprise a plurality of slides. Non-limiting examples of productivity applications or services comprise but are not limited to: presentation program applications/services (e.g., presentation applications/services); collaborative communication applications/services; software development applications/services; word processing applications/services; spreadsheet applications/services; notes/notetaking applications/services; authoring applications/services; presentation broadcasting applications/services; search engine applications/services; email applications/services; messaging applications/services; web browsing applications/services; digital assistant applications/services; webpage building applications/service; directory applications/services; mapping services; calendaring services; electronic payment services; digital data storage or distributed data storage applications/services; web conferencing applications/services; call communication applications/services; language understanding applications/services; bot framework applications/services; networking applications/service; and social networking applications/services, among other examples. In some examples, an exemplary productivity application/service may be a component of a distributed software platform providing a suite of productivity applications/services. A distributed software platform is configured to providing access to a plurality of applications/services, thereby enabling cross-application/service usage to enhance functionality of a specific application/service at run-time. Distributed software platforms may further manage tenant configurations/user accounts to manage access to features, applications/services, etc. as well access to distributed data storage (including user-specific distributed data storage). For example, a user account of a distributed software platform may be utilized to login to an application/service and be associated with a live camera feed. Moreover, specific application or services (including those of a distributed software platform) may be configured to interface with other non-proprietary application or services (e.g., third-party applications/services) to extend functionality including the collection of data pertaining to a user communication and analysis thereof.

As identified above, the application/service component 104 is configured to provide data for user access to an application/service including provision of a GUI for user access to an application/service. For instance, the application/service component 104 is configured to render and provide a GUI of an application/service by which users can manage presentation content. Management of presentation content comprises any instance of: creating/designing presentation content; editing presentation content; storing/recalling presentation content; and inclusion of presentation content during conducting of a presentation, among other examples. The application/service component 104 interfaces with the user computing device(s) 102 to enable provision of an exemplary GUI through the user computing device(s) 102 or display devices connected therewith. Through a GUI of an application or service, representations of presentation content including live camera feeds (or edited live camera feeds) may be provided through any type of GUI element including but not limited to: digital documents; GUI callouts; banners; notifications; messages; and GUI menus and windows, among other examples. Non-limiting examples of GUI representations associated with the present disclosure are illustrated in FIGS. 3A-3I, and further described in that accompanying description.

Applications or services, provided by the application/service component 104, may interface with other components of system diagram 100 to enhance processing efficiency and functionality as described herein. The application/service component 104 is configured to interface with a user computing device(s) 102 as well as the presentation feed management component 106, the component for implementation of trained AI processing 108 and knowledge repositories 110 (e.g., of a distributed software platform). In doing so, contextual signal data may be collected and analyzed to enhance processing described herein including contextual evaluations of presentation content and/or user communications used to present presentation content. Moreover, contextual signal data may be further analyzed to aid with temporal determinations, executed by the application/service component 104 and/or the presentation feed management component, including determining a timing as when to provide data insight suggestions (e.g., during creation of presentation content or at specific points during a real-time presentation). For instance, signal data associated with one or more of the user, user devices and/or executing applications or services, may be utilized to determine if it is appropriate to automatically surface a representation of a data insight at a current point in time or wait for a more opportune instance (e.g., after a user has stopped speaking or after the conclusion of a presentation). Non-limiting examples of signal data that may be collected and analyzed comprises but is not limited to: device-specific signal data collected from operation of one or more user computing devices 102; user-specific signal data collected from specific tenants/user-accounts with respect to access to any of: devices, login to a distributed software platform, applications/services, etc.; and application-specific data collected from usage of applications/services including data (and metadata) associated with specific presentation content. Application-specific signal data may comprise not only current signal data instances, but also past usage of an application or service by one or more users. For instance, signal data may be analyzed to determine past presentation content associated with a user and past user accounts that contributed to the past presentation content. Such contextual data can be used to generate data insight suggestions or effect automatic updates to content portions/content interactions. In further examples, similar presentation content from other user accounts may be identified that is related to presentation content included in a specific presentation (e.g., a slide-based presentation deck). Such contextual data may also be used to generate data insight suggestions or effect automatic updates to content portions/content interactions. In further examples, analysis of signal data may comprise identifying correlations and relationships between the different types of signal data, where telemetric analysis may be applied to generate the above identified contextual determinations (including timing determinations). Captured signal data and results of telemetric analysis thereof may be stored or subsequent retrieval via the knowledge repositories 110. It is further noted that any stored (or logged) data is retained in compliance with data privacy laws and regulations.

The presentation feed management component 106 is one or more components configured for management presentation content including live camera feeds and/or edited live camera feeds that are incorporated in presentation content. The presentation feed management component 106 executes processing operations that pertain to both creation/design of presentation content as well technical examples where presentation content is presented in real-time (or near real-time). Examples of processing operations executed by the presentation feed management component 106 (and/or interaction with the component for implementation of trained AI processing 108), comprise but are not limited to processing operations described in present disclosure including method 200 (FIG. 2A), method 250 (FIG. 2B) and those described in the description of FIGS. 3A-3I. For readability of the present disclosure, those processing operations are not explicitly restated in the description of presentation feed management component 106 but are understood to be executed thereby.

In one example, the presentation feed management component 106 provides design solutions enabling users to easily interject a representation of a live camera feed (or edited live camera feed) into presentation content. For example, an editable GUI object is able to be presented through a GUI enabling users to incorporate a representation of a live camera feed into slide-based content such as in technical instances when a user is creating/designing a slide-based template of a slide-based content presentation. The presentation feed management component 106 further provides capability of processing that fosters dynamic management of presentation content including interactions with live camera feeds during a presentation (e.g., live presentation of presentation content executed during a rehearsal presentation or during an exemplary user communication). Furthermore, an improved GUI is also described that present GUI elements and notifications to aid management of representations of live camera feeds relative to presentation content. For instance, live camera feeds can be dynamically added within slide-based content (e.g., a presentation slide) during real-time presentation. The presentation feed management component 106 may interface with the application/service component 106 to enable presentation of an improved GUI to produce results described herein.

The presentation feed management component 106 may further be configured to manage application of trained AI processing including building, training, and application of trained AI models (e.g., implemented as trained AI processing 108). In some technical instances, trained AI processing may be applied that is configured to automatically provide contextually relevant designations for live camera feed (e.g., specific user accounts or identification of specific computing devices) within a GUI menu that lists selectable GUI object options for which a user can insert into a slide-based template. For instance, a context associated with presentation content may be analyzed to identify relevant team members of a user or other users who commonly present with a user (or present on specific presentation content). In other examples, specific computing devices associated with a user (e.g., user smart phone, user laptop, etc.) may be identified in a listing of selectable GUI options to further In further examples, a GUI object may be modifiable after the insertion a GUI object into a slide-based template, where a user can manually associate that GUI object with a specific user account (e.g., of a distributed software platform) or a specific live camera feed designation (e.g., presenter, audience) that may be specific to an application or service that is hosting a presentation (e.g., electronic meeting). In other examples, the GUI object, inserted in the slide-based template, is modifiable after insertion to associate the GUI object with a specific computing device (e.g., of one or more presenters).

In further examples, trained AI processing is applied to enhance creation/design of presentation content. For instance, one or more trained AI models may be applied to aid modification and/or insertion of an exemplary GUI object within presentation content (e.g., a slide-based presentation). This may comprise automated generation of determinations and/or data insight suggestions that can be used for any of the following: to suggest a specific live camera feed to associate with a GUI object; to suggest a placement position of an exemplary GUI object within presentation content (e.g., relative to other content portions of the slide-based template); to suggest a content interaction between a GUI object one or more other content portions (content objects) of specific presentation content; and to automatically effect a content interaction between a GUI object and one or more other content portions of presentation content, among other examples.

The presentation feed management component 106 may further be configured to detect access to slide-based content (e.g., a displayed slide of a slide-based presentation) that comprises, within a displayed slide, a GUI object configured to activate a live camera feed. This may trigger application of trained AI processing that is configured to automatically create a representation of a live camera feed (or an edited live camera feed). An exemplary representation of a live camera feed may comprise one or more edited live camera feeds, from representations of live camera feeds, that are tailored for a slide-based presentation. In some examples, a trained AI model is configured to activate a live camera feed (as displayed through an application/service) and present an unedited live stream of that live camera feed at a location of a GUI object within a displayed slide. In further examples, a trained AI model may be utilized to generate an edited live camera that modifies the live camera feed for presentation within presentation (e.g., a displayed slide). In doing so, the trained AI model is configured to execute processing operations that comprise one or more of: generating an edited live camera feed for the live camera feed by removing a background associated with the live camera feed; analyzing content portions of presentation content (e.g., slide content portions of a slide and/or associated slide content interactions); and automatically formatting the edited live camera feed to fit within presentation content (e.g., a displayed slide) based on a result of analyzing the content portions and/or the content interactions. The edited live camera feed is then automatically displayed within the presentation content (e.g., displayed slide) based on a result of the automatically formatting of the edited live camera feed by the trained AI model. In some examples, multiple edited live camera feeds may be displayed in presentation content (e.g., a specific slide and/or slide-based presentation deck).

In further examples, trained AI processing is applied to enhance contextual evaluation of a presentation and associated presentation content. For instance, one or more trained AI models may also be applied to aid generation of data insight suggestions for managing representations of live camera feeds relative to presentation content. In execution, a trained AI model may be configured to analyze signal data (e.g., user-specific, device-specific and/or application-specific) associated with a presentation and generate data insight suggestions related to management of live camera feeds during a presentation (e.g., electronic meeting). This may comprise automated generation of data insight suggestions that can be used to recommend inclusion of live camera feeds in a slide-based presentation (e.g., slides thereof). Non-limiting examples of data insight suggestions that may be automatically provided for a user are illustrated in FIGS. 3F-3I and explained in the accompanying description.

Furthermore, the presentation feed management component 106 may be configured to manage retention of electronic files associated with presentation content. In some examples, presentations of content may be able to be recorded through an application/service that is used to conduct a user communication such as an electronic meeting. For instance, a user can select a GUI feature of an application/service to record a user communication such as an electronic meeting. In such examples, a recording of an electronic meeting may reflect the presentation of live camera feeds (or live camera edited feeds) within specific presentation content (e.g., slides of a slide-based presentation deck). Additionally, the presentation feed management component 106 may further be configured to provide a feature for automated recording of presentation content. For instance, the presentation feed management component 106 may detect presentation of presentation content during a user communication and automatically provide a GUI indication to notify a user that a presentation is being recorded. In some examples, a GUI indication may be a request for the user to confirm that they would like the presentation feed management component to automatically generate a recorded version of a slide-based presentation. In any example, recording of presentation content may be executed in compliance with user consent policies and/or applicable data privacy laws and regulations.

Whether or not a recording of presentation is manually triggered through an application/service used to conduct an electronic meeting, the presentation feed management component 106 may be configured to provide a GUI notification for a user to confirm that they would like the presentation feed management component 106 to automatically initiate recording (or saving) of a version of presentation content that comprises live camera feeds (or edited live camera feeds) as presented during a live presentation. Recording of presentation content may create an electronic file that associates the presentation content (e.g., slide-based templates) with specific live camera feeds that were incorporated (activated) therein during a presentation of the presentation content. The user can go back and review slides and the associated camera feeds that were activated during presentation of those slides. This may enable users to specifically focus their review on the presentation content (e.g., a slide-based presentation deck) rather than the entirety of what was happening during an electronic meeting with a plurality of live streams being concurrently presented.

Importantly, different versions of presentation content can be maintained (e.g., as a different electronic files). For instance, a user can use the same slide-based presentation deck and present it multiple different times, where different electronic files can be saved with different live camera feeds (e.g., specific to a presentation instance) each time a presentation is run. In further examples, this may also enable users to record a presentation with live camera feeds incorporated therein, recall the same at a later point of time and subsequently distribute that recorded version to other users. In this way, a recording of the live camera feeds (at the time of record) can be played back for users at a later point in time (e.g., not necessarily a live camera feed at the timing of playback).

As identified in the foregoing, the presentation feed management component 106 may be configured to manage notification of recorded presentation content automatically executed on behalf of users. As one example, after detecting conclusion of a user communication (e.g., an electronic meeting) a recorded version of presentation content can be automatically saved to a distributed data storage associated with a user account (e.g., of a distributed software platform) and/or a local data storage of a computing device that is used to conduct a presentation. In another example, a GUI notification may be presented after the completion of a presentation (e.g., a predetermined amount of time afterwards) to notify a user of a recorded version of presentation content. In some examples, the presentation feed management component 106 interfaces with the application/service component 104 to provide a GUI notification of a recorded version of presentation content through a GUI that is used to conduct a user communication (e.g., electronic meeting).

As referenced in the foregoing description, the presentation feed management component 106 is configured to apply trained AI processing 108 to aid processing in various contextual scenarios. Trained AI processing 108 may comprise implementation of one or more trained AI models. Implementation of trained AI modeling including creating, adapting, training, and updating of trained AI processing 108 is known to one skilled in the field of art. Trained AI processing 108 may be applicable to aid any type of determinative or predictive processing including specific processing operations described about with respect to determinations, classification ranking/scoring and relevance ranking/scoring. This may occur via any of supervised learning; unsupervised learning; semi-supervised learning; or reinforcement learning, among other examples. Non-limiting examples of supervised learning that may be applied comprise but are not limited to: nearest neighbor processing; naive bayes classification processing; decision trees; linear regression; support vector machines (SVM) neural networks (e.g., deep neural network (DNN) convolutional neural network (CNN) or recurrent neural network (RNN)); and transformers, among other examples. Non-limiting of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Non-limiting of semi-supervised learning that may be applied comprise but are not limited to: assumption determination processing; generative modeling; low-density separation processing and graph-based method processing, among other examples. Non-limiting of reinforcement learning that may be applied comprise but are not limited to: value-based processing; policy-based processing; and model-based processing, among other examples. Furthermore, trained AI processing may be continuously updated over time including based on receipt of user feedback regarding representations of provided through an improved GUI of an application or service.

Knowledge repositories 110 may be accessed to obtain data for generation, training and implementation of the trained AI processing 108 as well the operation of processing operations by that of the application/service component 104 and the presentation feed management component 106. Knowledge resources comprise any data affiliated with a software application platform (e.g., Microsoft®, Google®, Apple®, IBM®) as well as data that is obtained through interfacing with resources over a network connection including third-party applications/services. Knowledge repositories 110 may be resources accessible in a distributed manner via network connection that may store data usable to improve processing operations executed by the presentation feed management component 106 and/or the trained AI processing 108. Knowledge repositories 110 may be data stored on a distributed data storage that is accessible over a network connection. However, in some examples, data described with respect to knowledge repositories 110 may be stored locally on a computing device. Examples of data maintained by knowledge repositories 110 comprises but is not limited to: collected signal data (e.g., from usage of an application/service, device-specific, user-specific); telemetry data including past usage of a specific user and/or group of users; corpuses of annotated data used to build and train AI processing classifiers for trained relevance modeling; access to entity databases and/or other network graph databases; web-based resources including any data accessible via network connection including data stored via distributed data storage; trained bots including those for natural language understanding; data for stored representations of data insight suggestions; and application/service data (e.g., data of applications/services managed by the application/service component 104) for execution of specific applications/services including electronic document metadata, among other examples. Moreover, knowledge repositories 110 may further comprise access to a cloud-assistance service that is configured to extend language understanding processing including user context analysis to derive a current context of a user communication. The cloud-assistance service may provide the presentation feed management component 106 and/or application/service component 104 with access to larger and more robust library of stored data for execution of language understanding/natural language understanding processing including transcribing audio signals received from users/participants of a user communication. Access to the cloud-assistance service may be provided when an application/service is accessing content in a distributed service-based example (e.g., a user is utilizing a network connection to access an application/service), as the data of the cloud-assistance service may be too large to store locally. In further examples, the presentation feed management component 106 may be configurable to interface with a web search service, entity relationship databases, etc., to extend a corpus of data to make the most informed decisions when generating determinations related to contextual analysis of user communications. In further examples, telemetry data may be collected, aggregated and correlated (e.g., by an interfacing application/service) to further provide components of system diagram 100 with on-demand access to telemetry data which can aid determinations generated thereby including generation of data insight suggestions.

FIG. 2A illustrates an exemplary method related to management of a GUI element that is configured to activate a live camera feed within a slide-based presentation, with which aspects of the present disclosure may be practiced. As an example, method 200 may be executed across an exemplary computing system 401 (or computing systems) as described in the description of FIG. 4. Exemplary components, described in method 200, may be hardware and/or software components, which are programmed to execute processing operations described herein. Non-limiting examples of components for operations of processing operations in method 200 are described in system diagram 100 (FIG. 1). Processing operations performed in method 200 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 200 may be executed by a component such as the presentation feed management component 106 (of FIG. 1) and/or the component for implementation of the trained AI processing 108 (FIG. 1). In distributed examples, processing operations described in method 200 may be implemented by one or more components connected over a distributed network. For example, components may be executed on one or more network-enabled computing devices, connected over a distributed network, that enable access to presentation content and conducting of presentations through user communications.

Method 200 begins at processing operation 202, where a GUI, of a presentation application or service is presented enabling users to create/design presentation content. As indicated in the foregoing, presentation content is intended to cover any example where one or more content portions are inserted and arranged within a digital document or electronic file for presentation purposes. It is to be recognized that utility of the present disclosure extends to working with any type of electronic files or digital documents in which a live feed may be configurable as an inserted or embedded content portion. Types of electronic files and digital documents are known to one skilled in the field of art. As non-limiting examples, digital documents comprise but are not limited to: word processing documents; spreadsheet documents; notes documents; webpages; presentation documents (e.g., presentation slide, open canvas template); illustration documents (e.g., artboards, flowcharts, drawing documents); recording/editing documents (e.g., video or audio); messaging/email documents; and social networking objects (e.g., posts). For ease of explanation, reference is made to slide-based content as presentation content. Slide-based content is intended to cover any example (e.g. linear or nonlinear) where one or more content portions are inserted and arranged within one or more templatized canvases, which are viewable as (or convertible to) a presentation document. In one example, slide-based content is a linear representation (e.g., presentation slide provided through a presentation application/service such as POWER-POINT®). For example, a representation of a live camera feed is embedded as content within a slide of a slide-based presentation. Another example of slide-based content is a nonlinear representation where an open canvas template is provided and manipulated (e.g., via zooming) to present content portions thereof. For example, a portion of an open canvas template can be zoomed-in on to provide a fractional representation of the open canvas template.

As an example of presentation content, a user may launch a presentation application or service that is configured to manage (e.g., create or modify) slide-based content such as a slide-based presentation deck. A slide-based presentation deck is a grouping of a plurality of presentation slides that collectively represent presentation content as a version of slide-based content. In some examples, presentation slides (or hereafter "slides") of a slide-based presentation deck may have the same presentation theme. An exemplary presentation theme is a collective set of visual style attributes that are applied to the slides of the slide-based presentation deck. Non-limiting examples of visual style attributes of a presentation theme comprise but are not limited to: predefining layout attributes (e.g., grouping and/or layering of objects); colors scheme (including color scheme for a background of a slide); fonts (e.g., color, type, size); and visual effects, among other examples. A presentation theme thereby provides a presentation with a unified and harmonious appearance while minimizing the processing effort required to do so when creating a presentation through a GUI.

In processing operation 202, a user may utilize the GUI of the presentation application or service to create (or modify) a slide-based presentation deck that comprises one or more slides. The GUI of the presentation application or service may be improved over traditional GUIs by providing GUI elements that are specifically directed to the management of GUI objects configured to enable users to incorporate live camera feeds within slide-based templates of a slide-based presentation deck. For example, an improved GUI may be configured to present GUI elements that enable users to easily add, remove, modify, etc., GUI objects which represent a live camera feed, to one or more slides of a slide-based presentation deck. Non-limiting examples of GUI elements related to management of GUI objects of the present disclosure are presented in FIGS. 3A-3I and further described in the accompanying description thereof.

During presentation of a slide-based presentation deck (or slide-based templates thereof), an exemplary GUI object is configured to automatically activate a representation of live camera feed (e.g., edited live camera feed) that is specifically tailored for a context of a slide in which the live camera feed is being incorporated. In a design phase where a user is creating a slide-based presentation deck, the GUI object may be an editable placeholder for a live camera feed. One or more GUI objects can be added to slide of a slide-based presentation, where live camera feeds can be automatically added to any slide content of slide-based presentation deck through addition of exemplary GUI objects to a slide-based template (slide template). For instance, the same live camera feed can be added to each slide template of a slide-based presentation deck, which would result in activation of a representation of the same live camera feed within each slide of the slide-based presentation deck. In another example, one or more different live camera feeds can be added to different slide templates of a slide-based presentation, which would result in activation of a representation of different live camera feeds across slides of the slide-based presentation deck. Moreover, the present disclosure enables multiple GUI objects to be included within a specific slide of slide-based presentation content, where multiple live camera feeds (or representation thereof) may be concurrently actively and displayed within one or more slides of a slide-based presentation.

Presentation of a slide-based presentation deck may occur through the GUI of the presentation application or service or within a GUI of a different application or service. For example, a user may present a slide-based presentation deck via a GUI window of a collaborative communication service that is utilized to conduct an electronic meeting. In some technical instances, this may occur through interfacing between a presentation application or service and a collaborative communication application or service (e.g., by the application/service component 104 of FIG. 1), where a representation of a GUI of the presentation application or service may be presented in a GUI window of the communication collaborative application or service during conducting of an electronic meeting. In other technical instances, users may exclusively utilize a presentation application or service to present a slide-based presentation deck (or slide-based templates thereof). For example, this may occur during creation/design of a slide-based presentation deck, within a presentation mode of a presentation application or service, and/or in a mode that enables recording of a presentation of a slide-based presentation deck (e.g., a trial or rehearsal presentation or during a presentation to one or more other users).

Flow of method 200 may proceed to processing operation 204, where a first user action may be received through a GUI of a presentation application/service. For example, the first user action selects a GUI object, configured to activate a live camera feed, and places the GUI object within a slide template (or slide-based template) of a slide-based presentation deck (e.g., represented by a plurality of slide-based templates). In one example, processing operation 204 may comprise a user selecting a GUI element from an application command control menu provided through a GUI of a presentation application or service. For instance, a GUI menu of a GUI may be adapted to provide explicit GUI elements that are used to manage a state of a GUI object of the present disclosure. The user may execute an action that selects a GUI element, from the GUI menu, and places a GUI object within a slide template of a slide-based presentation deck. In one example, this may be a compound action such as a click-and-drag action that selects a representation of a GUI object from a GUI menu and drags that representation to a specific position within a slide-based template. In another example, a user may simply provide input through a series of device actions (e.g., mouse or stylus selection of GUI menu features) to automatically insert a GUI object within a slide-based template.

A GUI of presentation application or service makes it easy to correlate a user or device with a live camera feed by automatically providing identifying designations for live camera feeds during a presentation/user communication (e.g., presenter 1, presenter 2, audience member 1, audience members, specific user accounts of a distributed software platform, specific computing devices). In some examples, trained AI processing may be applied that is configured to automatically provide contextually relevant live camera feed designations (e.g., specific user accounts or identification of specific computing devices) within a GUI menu that lists selectable GUI object options for which a user can insert into a slide-based template. In doing so, a trained AI model may be configured to analyze a context associated with presentation content (e.g., part of or an entirety of a slide-based presentation deck), including any of the examples of signal data previously described individually or collectively. A relevance ranking may be identified to curate a listing of user accounts and/or specific computing devices (e.g., user laptop, user tablet, user mobile phone) that a specific user may predictively wish to incorporate within a slide-based template. This may include assigning relevance scoring to specific user accounts or computing devices based on a relevance of a user account/computing device to the presentation content (e.g., an individual slide-based template that a user is creating/modifying or the entire slide-based presentation deck). For instance, data and/or metadata associated with presentation content (e.g., slide-based templates), users associated with the presentation content, devices associated with the presentation content, etc., may be identified and analyzed, where relevance scoring may be generated from this analysis. An AI model may be trained to identify specific associations between content portions, metadata and/or users. Once relevance scores are generated, one or more designations (e.g., N number of user accounts) may be output for presentation in GUI menu listing. To help curate that listing, the designations that are output may be required to satisfy a threshold relevance score as set by developers. As a practical example, a context associated with presentation content and/or business associations of a user may be analyzed to identify relevant team members of a user or other users who commonly present with a user (or present on specific presentation content). Based on a result of the generated relevance scoring and analysis thereof, one or more of those team members may be listed in a GUI menu providing suggestions for one or more user account designations to associate with a GUI object.

In some examples, specific user account designations for GUI objects may be presented in addition to general designations (e.g., presenter 1, presenter 2, audience) that could be assigned at run-time of a presentation (e.g., by an application or service). In further examples, a user may select a GUI element that triggers automated generation of contextual designations for GUI objects. For instance, an initial listing of GUI objects may be provided in a GUI menu that further comprises a selectable GUI element, which when selected, would automatically populate the GUI menu with GUI objects having customized designations (e.g., specific user accounts and/or specific computing devices). In any example, automated generation of specific designations improves efficiency when correlating GUI objects with presentation content as intelligently and predictively relevant designations may prevent a user from having to execute manual actions to search for user contact information and subsequently modify a GUI object (with user contact information) after a GUI object is inserted into a slide-based template.

In response to receiving the first user action, flow of method 200 may proceed to processing operation 206, where a GUI object is automatically added to the slide-based template (or a slide) of a slide-based presentation deck. As referenced in the foregoing, the GUI object may be automatically added to a slide-based template at a specific location selected by a user or at a random location (e.g., determined relative to other content portions of a slide-based template). Once a GUI object automatically appears within a slide-based template, the GUI can be further edited by the user. As identified in the foregoing, the GUI object is an editable content portion within a slide-based template. A GUI object described herein is editable where users can directly apply thereto any of: object formatting options, modification of layouts and styles, animations, etc., as well as modify the GUI object to assign a designation to a GUI object such as a specific user account and/or specific computing device as a subject of the live camera feed.

In some examples of method 200, a user may execute (processing operation 208) a subsequent user action to assign a designation of a GUI object thereby setting a subject of the live camera feed. This may occur in technical instances such as: where selectable GUI object options, provided in a GUI menu, are not automatically assigned with specific user accounts; where users do not make a request through the GUI to receive GUI objects assigned to specific user accounts; and/or the user does not see a specific user account assignment they prefer within a list of selectable GUI object options (e.g., even after a request for additional designations is made through a GUI). The GUI object, inserted in the slide-based template, is modifiable to associate the GUI object with a specific user account (e.g., of a distributed software platform) and/or a specific computing device (e.g., of one or more presenters). As indicated in the foregoing, a GUI object may be modifiable from within a GUI menu (e.g., a listing of selectable GUI object options) and/or after a GUI object is inserted into presentation content such as a slide-based template. This includes modification or assignment of a designation for a GUI object. In examples where a user provided a user action (processing operation 208) to assign a designation to a GUI object, flow of method 200 proceeds to processing operation 210, where a designation for a live camera feed is assigned a GUI object. This may be reflected in a GUI of an application or service such as a presentation application or service.

Method 200 may then proceed to enable users to create content interactions for a slide-based template (or between slide-based templates) which involves the GUI object. In some examples, trained AI processing is applied to enhance creation/design of presentation content. This may comprise automated generation of data insight suggestions and/or content interactions that can be used for any of the following: to suggest a placement position of an exemplary GUI object within presentation content (e.g., relative to other content portions of the slide-based template); to suggest a content interaction between a GUI object one or more other content portions (content objects) of specific presentation content; and to automatically effect a content interaction between a GUI object and one or more other content portions of presentation content, among other examples. A trained AI model may be applied to execute relevance analysis where the trained AI model is configured to evaluate a relevance of content portions (and associated metadata) of presentation content (e.g., one or more slide-based templates) to generate determinations that are usable for presentation of data insight suggestions and/or automatically applying content interactions to presentation content that comprises exemplary GUI objects. A relevance analysis may comprise identifying relevant content portions and/or content interactions from contextual signal data analysis to generate the previously referenced determinations. In doing so, a relevance analysis may evaluate one or more content portions (e.g., GUI objects) relative to other content portions within presentation content (e.g., a slide-based template or an entirety of a slide-based presentation deck).

Considering an evaluation of a GUI object that is inserted into a slide-based template, an AI model of the present disclosure may be trained to contextually analyze attributes associated with content portions score a relevance of a content portion to a specific GUI object. In doing so, attributes of content portions may be identified and correlated with attributes of a GUI object. Non-limiting of attributes for contextual evaluation comprise but are not limited to: object type; entity type; size and layout information; shape position information including shape type, shape fill type, shape color, and shape layering/grouping; and associated content interactions corresponding with specific content portions, among other examples. An AI model may be trained to generate a relevance score based on a correlation between attributes of a content portion and a GUI object as well as result of contextual signal data related thereto. Examples of signal data, including application-specific signal data, have been described in the foregoing description. For instance, past application-specific data associated with usage of presentation content (e.g., by one or more users) may be utilized to identify relevant content and/or content interactions that can be applied to a GUI object. A trained AI model may be configured to curate potential data insight suggestions and/or determine whether to automatically apply content interactions based on a result of a relevance scoring. Once relevance scores are generated, one or more determinations may be propagated to aid generation of data insight suggestions and/or automatic application of a content interaction. Similar to previous applications of relevance analysis, a trained AI model may be configured to apply a threshold relevance analysis to help predictively determine content interactions that may be most beneficial for a user given a context of a slide-based template. For instance, a threshold for a relevance score may be utilized to identify N number of determinations that may be worthwhile to provide to a user. A threshold relevance score for a threshold evaluation may be set by developers and vary without departing from the spirit of the present disclosure.

In one example, a GUI object may be inserted into presentation content by a user, where a notification of a data insight suggestion may be automatically presented in a GUI for the user to help the user select a content interaction (e.g., animation. aggregated representation) to apply. For instance, contextually analysis of content of a slide-based template, including the GUI object, may yield a suggestion to create an animation between the GUI object and one or more other content portions of a slide-based template. A data insight suggestion of the like may be presented through a GUI to a user during creation/design of the slide-based template to help users improve their presentation through incorporation of effective content interactions. In further examples, a trained AI model is configured to automatically apply a content interaction on behalf of a user based on a result of analysis of the GUI object relative to other content portions of a slide-based template. In some examples, this content interaction may be explicitly highlighted for a user to help provide a visually understanding of the content interaction. A user may then have the option to easily undo this content interaction (e.g., via a selection of a GUI feature) or may keep the content interaction and even built off that content interaction.

Continuing method 200, a user action may be received (processing operation 212) that creates a content interaction between the GUI object and one or more other content portions of the slide template (e.g., in which the GUI object was inserted). In one example, the user action is an action to create, as the content interaction, a slide animation (or content animation) content that causes a live animation between the GUI object and another content portion of the slide-based template. For instance, a user action may create an animation (transitional or persisting) between an activated live camera feed (or edited live camera feed) and one or more other content portions of the slide-based template. This may occur based on manual input by a user or based on an automatically presented data insight suggestion (or automatic application of a content interaction). As an example, a user may wish to create a motion animation that involved the GUI object, where a live camera feed (or edited live camera feed) is in motion during part of (or all) of the presentation of a display slide associated with the slide-based template. In other examples, a user may wish to pre-configure movement of a GUI object between different locations during presentation of a slide, for example, to emphasis a focus on a live camera feed as a user progresses through a presentation. In yet another example, the user action is an action that modifies, as the content interaction, another content portion to create an aggregated representation comprising the GUI object and the content portion being modified. For instance, a user may wish to visually incorporate a live camera feed within a specific content object that is displayed during presentation of a slide.

In response to receiving a user action to create a content interaction with an exemplary GUI object, a content interaction is assigned (processing 214) to the slide template. Once a user has completed editing slide-based templates of the slide-based presentation deck, the user may then, through the GUI, trigger rendering (processing operation 216) of the slide-based presentation deck. Processing operation 216 may comprise automatically activating a representation of a live camera feed and/or the content interactions associated therewith when a slide is displayed that is associated with a slide-based template comprising a GUI object. As an example, rendering (processing operation 216) of a slide-based presentation deck may occur based on a user selection of a GUI feature via an application command control in a GUI of a presentation application or service. For instance, after a user completes creation/design of the slide-based presentation deck, they may wish to view a result of their work to view how an activated live camera feed (and associated content interactions) appear prior showing the slide-based presentation deck to other users.

In some cases, a user may wish to make additional edits to the slide-based presentation deck. In other cases, the slide-bases presentation deck may be ready for presentation. Other examples of rendering (processing operation 216) may occur at a subsequent point in time when a user associated an electronic file associated with the slide-based presentation deck with another application/service. For instance, a user may attach the slide-based presentation deck to an electronic meeting, where opening the slide-based presentation deck during an electronic meeting may be a trigger to render a representation of the slide-based presentation deck.

Continuing with method 200, flow may proceed to decision operation 218, where it is determined whether additional editing is to occur on the slide-based presentation deck. As indicated in the foregoing, this may occur if a user takes manual action to edit/modify any of the slide-based templates of the slide-based presentation deck. In instances where additional edits are to be made, flow of decision operation 218 branches "NO" and processing of method 200 may return back to processing operation 204. For example, a user may wish to make edits or modify a GUI object or add additional GUI objects to slide-based templates. In examples where no additional edits are to be made, flow of decision operation 218 branches "YES" and processing of method 200 proceeds to processing operation 220.

At processing operation 220, the slide-based presentation deck is stored for recall and subsequent presentation. For example, an electronic file associated with the slide-based presentation deck may be stored on a data storage (e.g., local data storage and/or distributed data storage. In one example, a copy of an electronic file associated with the slide-based presentation deck is stored on a distributed data storage associated with a user account of a distributed software platform. For instance, distribute data storage (e.g., cloud-based data storage) may be assigned to a specific user account such as a user that is creating/designing the slide-based presentation deck. In at least one example, an electronic file associated with the slide-based presentation deck is automatically stored on the distributed data storage as the user is editing an electronic file. This may aid the user in instances where a user computing device (e.g., user computing device 102) crashes while the user is creating the slide-based presentation deck. A user may then access the electronic file associated with the slide-based presentation deck at a subsequent point in time to present the slide-based presentation deck.

FIG. 2B illustrates an exemplary method related to management of activation of live camera feeds within a slide-based presentation, with which aspects of the present disclosure may be practiced. As an example, method 250 may be executed across an exemplary computing system 401 (or computing systems) as described in the description of FIG. 4. Exemplary components, described in method 250, may be hardware and/or software components, which are programmed to execute processing operations described herein. Non-limiting examples of components for operations of processing operations in method 250 are described in system diagram 100 (FIG. 1). Processing operations performed in method 250 may correspond to operations executed by a system and/or service that execute computer modules/programs, software agents, APIs, plugins, AI processing including application of trained data models, intelligent bots, deep learning modeling including neural networks, transformers and/or other types of machine-learning processing, among other examples. In one non-limiting example, processing operations described in method 250 may be executed by a component such as the presentation feed management component 106 (of FIG. 1) and/or the component for implementation of the trained AI processing 108 (FIG. 1). In distributed examples, processing operations described in method 250 may be implemented by one or more components connected over a distributed network. For example, components may be executed on one or more network-enabled computing devices, connected over a distributed network, that enable access to presentation content and conducting of presentations through user communications.

As referenced in the foregoing description, slide-based content (e.g., a slide-based presentation deck) is just one example of presentation content in which the present disclosure may be configured to work with. For ease of explanation of method 250, a slide-based presentation deck is described as presentation content. Method 250 begins at processing operation 252, where a slide-based presentation deck is displayed (or rendered) in a GUI of an application or service. As previously referenced, a presentation feed management component (106 of FIG. 1) is configured to dynamic manage presentation content including interactions with live camera feeds during a presentation that is being conducted in real-time (or near real-time). In one example of processing operation 252, a slide-based presentation deck may be rendered in a GUI of a presentation application or service. In other examples, including those where other types of presentation content are being presented, a representation of presentation content may be rendered in a GUI window of another application/service such as a collaborative communication application or service that is used to execute a user communication such as an electronic meeting. For instance, a slide-based presentation deck may be presented in a GUI window of an application or service. As referenced in the foregoing, non-limiting examples of applications/services may comprise: a presentation application or service, and a collaborative communication application or service that is being used to conduct an electronic meeting.

During presentation of a slide-based presentation deck, flow of method 250 may proceed to processing operation 254. At processing operation 254, the presentation feed management component may be configured to detect access to a slide, of the slide-based presentation deck, that comprises, within the slide, a GUI object configured to activate a live camera feed. This may trigger application of a trained AI model that is configured to automatically create a representation of one or more live camera feeds that are tailored for the slide-based presentation. In alternative examples, trained AI processing may be configured to execute processing for rendering of representation of a live camera feed within presentation content based on detecting initial access to a slide-based presentation deck (e.g., does not require that a specific slide be accessed within a slide-based presentation deck). This may enable a presentation feed management component to dynamically manage rendering of representations of live camera feeds across the entirety of presentation content in an efficient manner. For instance, the presentation feed management component may have to quickly change representations of live camera feeds as slide content changes and further queue representations of live camera feeds that were previously displayed for recall. As an example, a GUI object may be presented in association with a displayed slide and a user may change slides where a new live camera feed is displayed or a presenter may return back to the previous slide where a live camera feed requiring a recall of a previously displayed live camera feed. In examples where the same representation of a live camera feed is to be displayed on multiple slides (e.g., a presenter has set each slide to include the same live camera feed), the feed management component can continue presenting the same representation of a live camera feed without having to regenerate a completely new representation.

Continuing method 250, trained AI processing is applied (processing operation 256), where a trained AI model may be utilized to properly render a representation of one or more live camera feeds into presentation content. In doing so, the trained AI model is configured to execute processing operations to tailor a live camera feed for presentation in a slide of the slide-based presentation deck. As previously indicated, a representation of a live camera feed is intended to cover examples where a live camera feed is presented relative to a configuration of an exemplary GUI object (e.g., the stream of live camera stream is unedited but the size/formatting is modified relative to the attributes of a GUI object) as well as technical instances where an edited live camera feed is rendered and presented. An edited live camera feed is a representation of a live camera feed where additional processing operations have been applied to modify a stream (e.g., live video stream) of a live camera feed from its original presentation state to a state that is specifically tailored to fit presentation content. In some examples, multiple live camera feeds (and/or edited live camera feeds) may be displayed in a specific slide and/or slide-based presentation deck.

In any example, application (processing operation 256) of a trained AI model may comprise modifying a live camera feed from its original representation as displayed in a GUI of another application/service (e.g., a live stream presented during an electronic meeting). In examples where a live camera feed is activated and the video stream thereof is displayed in an unedited state, a trained AI model may be still configured to execute processing operations that modify size and/or formatting of a live camera feed to match the attributes of a GUI object as presented in a slide-based template for a displayed slide. In such technical instances, a trained AI model may be configured to automatically analyze attributes of slide content portions (e.g., a GUI object) of a slide and/or associated slide content interactions; automatically generate formatting determinations therefrom; and automatically format the live camera feed to fit within a slide based on formatting determinations generated as a result of analyzing the slide content portions and/or the slide content interactions. Training of an exemplary AI model may be configured to automatically modify size, layout formatting, layering, etc. of a live camera feed in accordance with determined attributes associated with a specific slide of a slide-based presentation deck. For instance, attributes associated with a GUI object and/or other content portions may be retrieved and used to determine a presentation of a live camera feed within a slide. This highlights a key technical distinction over traditional instances presentation of a live stream which may only layer a live stream over other types of content (e.g., a GUI window of a live video stream is presented overlaying other meeting content). Non-limiting examples of attributes of content portions have been provided in the foregoing description, where a trained AI model may be trained based on any of those non-limiting attributes to generate determinations used to format a stream of a live camera feed.

Additionally, when generating a live camera feed, analysis by a trained AI model may further consider attributes of the GUI object relative to other slide content portions (e.g., content objects) and/or content interactions between one or more slide content portions and a GUI object. This may require that formatting associated with a live camera feed be modified on a frame-by-frame basis during presentation of a displayed slide. For example, a processing result from application of a trained AI model may create a representation of a live camera feed that is included in a slide animation with one or more other content portions of a slide, where a size and/or formatting of a stream of a live camera feed may be modified in accordance with progress of that slide animation. As such, traditional instances of presentation of a live stream do not consider a representation of a live stream as part of specific presentation content (e.g., a slide). This prevents traditional instances of presentation of a live stream from efficiently enabling a live stream to interact with underlying presentation content and certainly prohibits traditional systems from automatically applying AI modeling to create a formatting representation that accounts for (and interacts with) specific types of presentation content such as slide content portions of a displayed slide.

In some alternative examples, a trained AI model may be configured to execute processing operations to generate an edited live camera feed as the representation of the live camera feed. As such, a representation of a live camera feed may comprise generating an edited live camera feed and activating the edited live camera feed within a displayed slide. Generating of an edited live camera feed may comprise execution of processing operations that remove a background associated with a stream of the live camera feed. This may be a first step in tailoring a live camera feed for inclusion in presentation content. In doing so, the trained AI model may be configured to adjust and soften a background associated with a stream of a live camera feed. In one example, a shape builder tool may be automatically applied to modify a background associated with a stream of a live camera feed. For instance, processing of the trained AI model may be configured to combine shapes of objects associated with a background, merge the objects into a combined shape, and soften or blur the combined shape to focus on one or more presenters within a live stream. Other technical examples for removing a background of a live video stream may also be applied as known to one skilled in the field of art. Additionally, generation of an edited live camera feed may further comprise execution of processing operations to that modify size and/or formatting of the edited live camera feed to fit the attributes of a GUI object as presented in a slide-based template for a displayed slide. Processing operations for modification of attributes associated with a live camera feed have been described in the foregoing description and are also applicable to edit a rendering of an edited live camera feed.

Method 250 may proceed to processing operation 258, where a representation of one or more live camera feeds is displayed within a slide-based presentation deck. Processing operation 258 may comprise automatically a live camera feed (or edited live camera feed) within a slide based on a processing result of application of the AI model. As a non-limiting technical example, a slide-based presentation deck may be presented in a GUI window of a collaborative communication application or service that is being used to conduct an electronic meeting. When the live camera feed (or edited live camera feed) is displayed, the representation of live camera feed is displayed as a part of a slide within that GUI window (e.g., that is presenting the slide-based presentation deck). This creates a representation of a live camera feed (or edited live camera feed) that transforms the original live stream for inclusion within the slide-based presentation deck. In some examples, the presentation feed management component (106 of FIG. 1) may interface with the application/service component (104 of FIG. 1) to hide or minimize the original live stream of a presenter so multiple representations of a live stream of a presenter are not concurrently presented during an electronic meeting. This may help focus the attention of participants on the presentation content and live camera feed presented therein. In such technical instances, processing operations may be executed where the presentation feed management component sends a request to prioritize the presentation content (and live camera feeds presented therein). This processing can be used to toggle control over live streams during a presentation to help focus the attention of participants. For instance, when a live camera feed (or edited live camera feed) is no longer part of the presentation content (e.g., a slide has changed that does not include the live camera feed) then a live stream of a presenter or the like may again be automatically prioritized for display to other participants.

Flow of method 250 may proceed to decision operation 260, where it is determined whether there are additional live camera feeds programmed into presentation content. As an example, this may comprise identifying the existence of addition GUI objects within slides of a slide-based presentation deck. In technical instances where additional live camera feeds are programmed to be activated during a presentation, flow of decision operation 260 branches "YES" and processing of method 250 returns to processing operation 254. For instance, access may be detected to a subsequent slide (e.g., second slide), of a slide-based presentation, that comprises one or more GUI objects. The trained AI model is configured to automatically generate a second live camera feed (or edited live camera feed) from an associated GUI object of the subsequent slide. This may occur using similar processing operations as previously described including the prior description of method 250. For example, a second live camera feed (or edited live camera feed) may be displayed in association with presentation of a second displayed slide during a presentation. In examples where there are no additional GUI objects to activate during a presentation, flow of decision operation 260 branches "NO" and processing of method 250 proceeds to processing operation 262.

In addition to application of a trained AI model that is configured to generate representations of live camera feeds, one or more additional trained AI models may be applied (processing operation 262) to enhance contextual evaluation of a presentation and associated presentation content. At processing operation 262, one or more trained AI models may also be applied to aid generation of data insight suggestions related to management of live camera feed during occurrence of a user communication (e.g., an electronic meeting). Non-limiting examples of data insight suggestions that may be automatically provided for a user are illustrated in FIGS. 3F-3I and explained in the accompanying description. A trained AI model, executed in processing operation 262, may be configured to analyze signal data (e.g., user-specific, device-specific and/or application-specific) associated with a presentation relative to a current context of the presentation content during a presentation. Data insight suggestions related to management of live camera feeds during a presentation (e.g., electronic meeting) may be generated and surfaced to users through a GUI (e.g., GUI notification). This may comprise automated generation of data insight suggestions that can be used to recommend inclusion of live camera feeds in a slide-based presentation (e.g., slides thereof).

In doing so, a trained AI model, configured for data insight suggestion generation related to incorporation of live camera feeds into presentation content, may be configured to analyze a relevance of contextual signal data collected during a user communication relative to determine whether a suggestion should be made to add a live camera feed to presentation content. In one example, a trained AI model may be configured to analyze contextual signal data collected relative to a current context of the presentation content presented during a user communication. For example, audio and/or video streams of participants during an electronic meeting may be analyzed relative to the current content that is displayed on a slide of a slide-based presentation deck. In one instance, a transcription of audio during an electronic meeting may be transcribed and analyzed to identify if a participant is discussing a topic that is related to content of a current slide. Keywords from a transcription may be correlated with content portions (and related metadata) of presentation content (e.g., a slide of a slide-based presentation deck). A relevance score may be generated to determine how relevant a live feed is to the currently displayed presentation content (e.g., a current context of the presentation content). To help curate relevance scores a threshold relevance score for generating a data insight suggestion may be set by developers. For instance, a data insight suggestion may be generated for determinations that have a relevance score over a threshold relevance score.

In further examples, an ad hoc presenter may be showing a visual diagram of content that is highly relevant to a current slide of a slide-based presentation. Optical character recognition (OCR) or the like may be applied to understand a context of that visual diagram and a relevance analysis may be executed that correlates content of the visual diagram to a current slide. In instances where it is deemed that the content of the visual diagram is relevant to current slide of a slide-based presentation deck, a suggestion may be presenter that enables a presenter to automatically add a live camera feed to a current slide. As such, this type of analysis may occur ad hoc during an electronic presentation such as where an audience member is asking a question that triggers an important discussion of content within a slide.

In additional examples, a trained AI model may be configured to analyze other types of contextual signal to generate a suggestion for incorporating a live camera feed into presentation content. For instance, in the example where an audience member has a question to ask, that audience member may provide an indication of a hand raise (e.g., through a computing device) to signal an interest in furthering a discussion. This may be a trigger to automatically provide a GUI notification that enables a presenter to automatically add a live camera feed for that audience member within a slide of a slide-based presentation deck. In some examples, a relevance analysis may still be executed in that scenario, but in other instances a data insight suggestion may be automatically surfaced to a computing device of a presenter to provide the presenter with immediate control over adding a live camera feed to a slide. It is to be noted that the present disclosure may provide a presenter with a capability to receive GUI notifications at a specifically designated computing device. This is extremely beneficial in instances where a presenter is executing an in-person presentation to an audience. For example, a presenter may be using its laptop to present presentation content and configure its mobile phone to receive GUI notifications as to control over adding live camera feeds to the presentation content so as not to interrupt the flow of the presentation on a display that is viewable to a live audience.

Flow of method 250 may proceed to processing operation 264. At processing operation 264, one or more data insight suggestions are generated for incorporating a live camera feed into presentation content. As indicated in the foregoing, data insight suggestions may be generated (processing operation 264) based on determinations generated by one or more trained AI models from analysis of relevance contextual signal data collected during a user communication. Processing for generating data insights based on specific types of content are known to one skilled in the field of art.

Once data insight suggestions have been generated, flow of method 250 may proceed to processing operation 266. At processing operation 266, data for rendering a data insight suggestion may be transmitted to an application/service for rendering in a GUI. As indicated in the foregoing, in some technical instances data for rendering of a data insight suggestion may be transmitted to a computing device that is presenting a GUI for a user communication (e.g., an electronic meeting). In other technical instances, data for rendering of a data insight suggestion may be transmitted to a different user computing device that a user has designated to receive GUI updates during occurrence of a presentation. Whichever computing device receives data for rendering a data insight suggestion may proceed to present (processing operation 268) a data insight suggestion in a GUI. This may further comprise presenting selectable GUI features that enable a user to automatically incorporate a live camera feed into presentation content. In some instances, a user may decline a data insight suggestion (e.g., through a selectable GUI feature) or a data insight suggestion may automatically disappear from display after a predetermined amount of time.

Flow of method 250 may then proceed to decision operation 270. At decision operation 270 it is determined whether a presentation has ended. This may comprise a contextual evaluation of signal data associated with a user communication to generate a determination as to whether a user communication has concluded. In technical instances where a presentation is continuing, flow of decision operation 270 branches "NO" and processing of method 250 returns to processing operation 262 to execute additional contextual analysis (e.g., generate additional data insight suggestions). In instances where it is determined that a presentation has concluded, flow of decision operation 270 branches "YES" and processing of method 250 ends (remains idle until a new user communication is initiated).

FIGS. 3A-3I illustrate exemplary processing device views associated with user interface examples for an improved user interface that is configured enable management of live feeds within slide-based presentations, with which aspects of the present disclosure may be practiced. FIGS. 3A-3I provide non-limiting front-end examples of processing described in the foregoing including system diagram 100 (FIG. 1), method 200 (FIG. 2A) and method 250 (FIG. 2B).

Figure 3A:
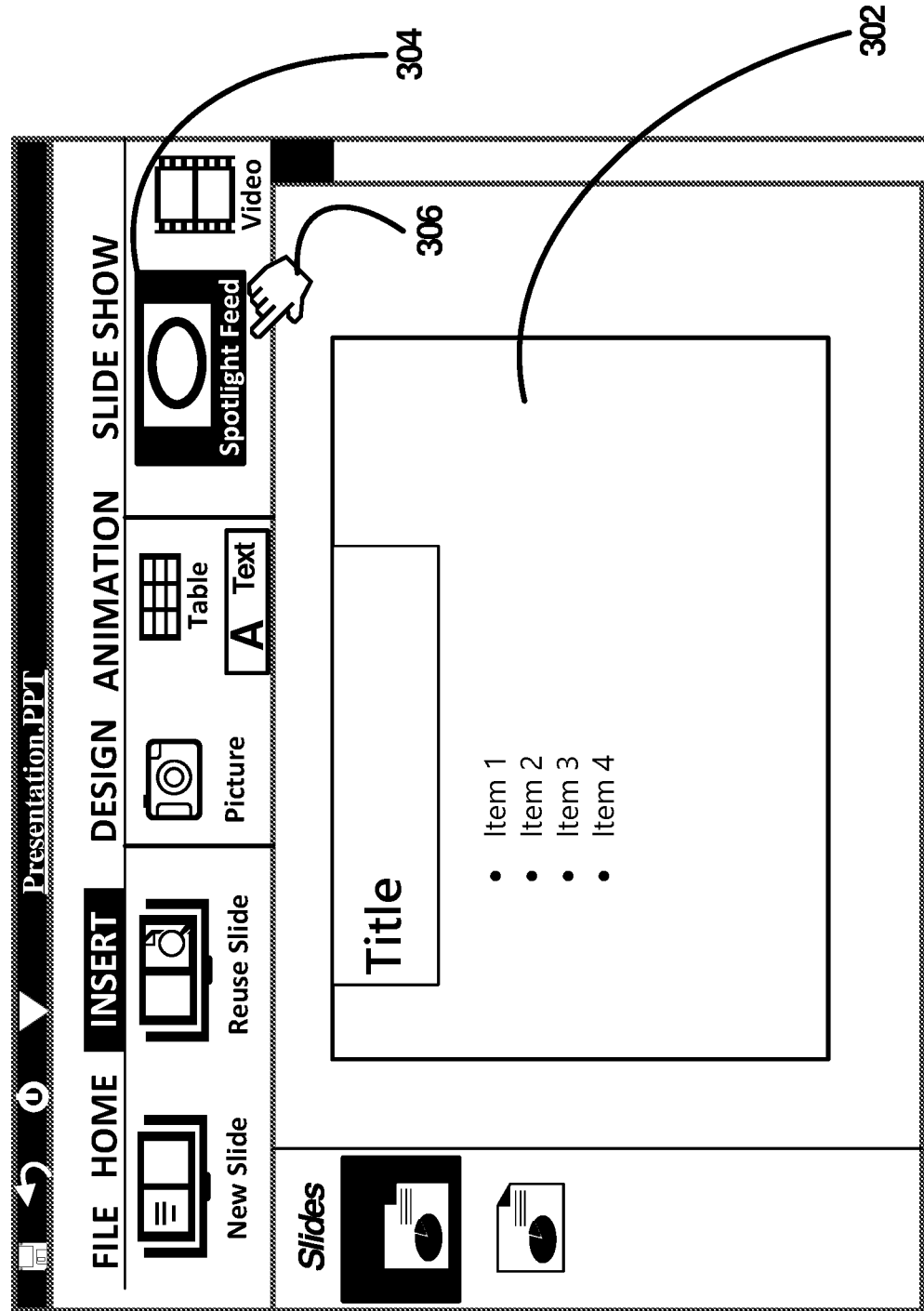

FIG. 3A presents processing device view 300, illustrating an improved GUI of a presentation application or service (e.g., POWERPOINT®) that is configured to manage presentation content. In the example shown in processing device view 300, the GUI, of the presentation application or service, displays a slide representation 302 (e.g., slide-based template) illustrating a slide that is being created/designed. A user may edit content of the slide representation 302 including content provided therein and/or presentation themes associate with slides of a slide-based presentation deck. Processing device view 300 further illustrates GUI features/elements that enable users to insert exemplary GUI objects of the presentation disclosure within the slide representation 302. For instance, an exemplary GUI object is configured to provide representation of a live feed (e.g., live camera feed) within slide-based presentation content. When a slide-based presentation deck is presented in a presentation mode of the presentation application or service, an inserted GUI object would activate a live camera feed (or edited live camera feed) upon presentation of a corresponding slide. In processing device view, a user is accessing an application command control GUI menu ("INSERT"), where the application command control GUI menu is modified to include a selectable GUI feature 304 that enables a user to insert a GUI object within the slide representation 302. For instance, a user action 306 may be initiated, via user input, that selects the selectable GUI feature 304. This may be a trigger for displaying a GUI menu that is specific to management of exemplary GUI objects (as shown in FIG. 3B) of the present disclosure.

Figure 3B:
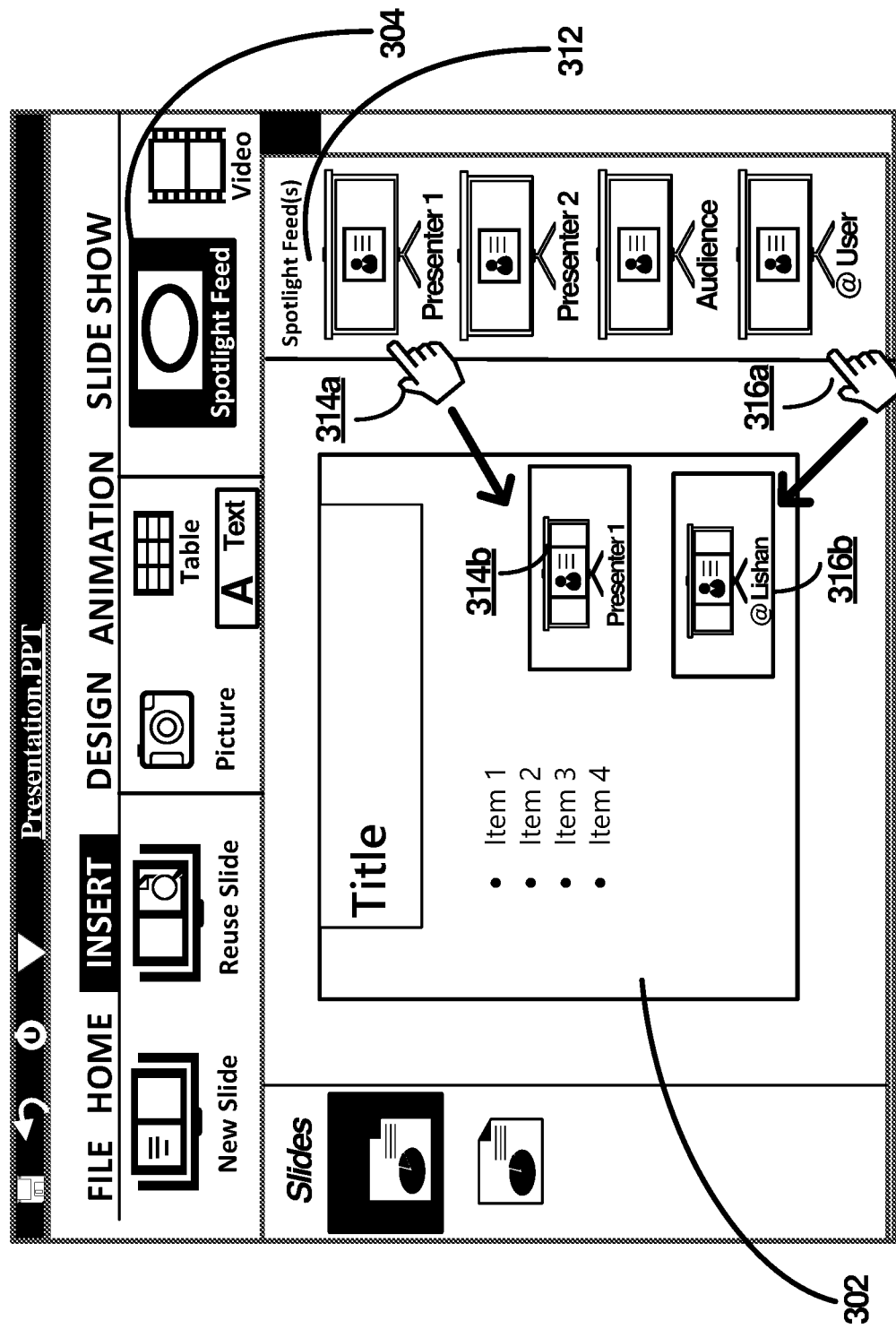

FIG. 3B presents processing device view 320, illustrating a continued example of the slide representation 302 that is shown in processing device view 300 (FIG. 3A). The example shown in processing device view 320 illustrates a GUI menu 312 specifically configured to provide visual representations of GUI objects described in the present disclosure. For instance, a selection of the selectable GUI feature 304 (FIG. 3A) may automatically trigger display of the GUI menu 312 in separate side pane or GUI window so as not to obstruct editing of the slide representation 302. As can be seen in processing device view 320, GUI menu 312 presents GUI objects having various designations (e.g., "presenter 1", "@user"). Designations associated with GUI objects and management thereof have been described in the foregoing description. The "@user" designation is intended to represent instances where a user account (e.g., of a distributed software platform) can be assigned as a subject of a live camera feed. For instance, a user may use their user account to sign into an electronic meeting, where an application/service may detect a live camera feed associated with that specific user account upon connecting a user to the electronic meeting.

Furthermore, processing device view 320 illustrates the execution of user actions 314 and 316, where a user selects specific GUI objects to insert within the slide representation 302. These actions visually represent an instance where a user is creating a slide that will comprise multiple live camera feeds. In the example shown in processing device view 320, a user executes a first user action 314 to select a first GUI object 314a (e.g., "Presenter 1") from the GUI menu 312 and drops the first GUI object at a first placement position 314b within the slide representation 302 thereby completing the first user action. Further, a user executes a second user action 316 to select a second GUI object 316a (e.g., "@user") from the GUI menu 312 and drops the second GUI object at a second placement position 316b within the slide representation 302 thereby completing the second user action. As shown in an update of slide represent 302, the user has modified a designation associated with the second GUI object 316a, changing the designation to a user contact of "@Lishan". It is to be recognized that user actions 314 and 316 may be executed via: a click-and-drag action, double tap and drag (of the GUI object), voice command or any other types of input recognition as known to one skilled in the field of art.

Figure 3C:
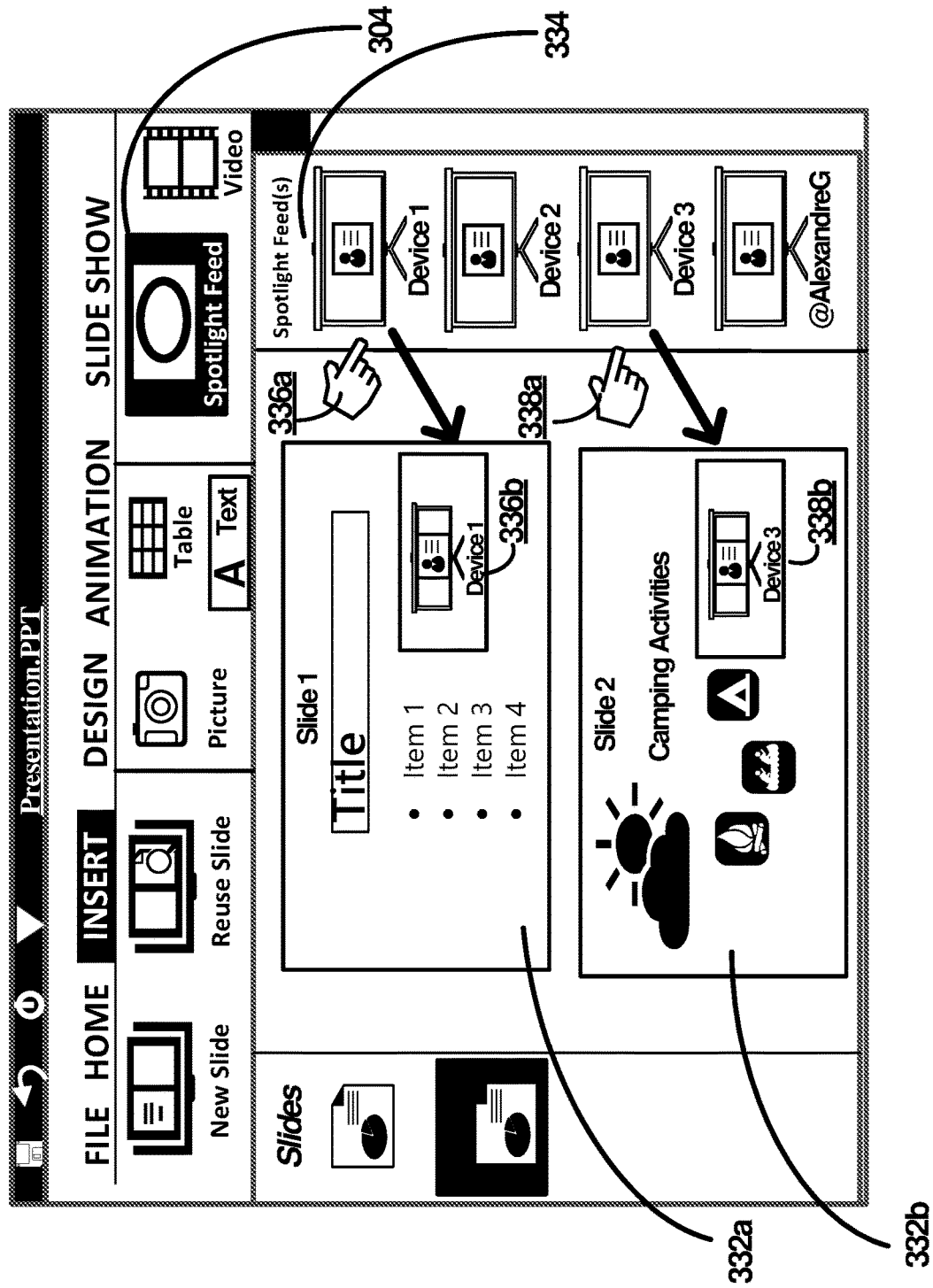

FIG. 3C presents processing device view 330, illustrating an alternative example of incorporation of GUI objects into slide representations. The example shown in processing device view 330 visually illustrates that GUI objects may be inserted into different slide templates of a slide-based presentation. A first slide-based template 332a and a second slide-based template 332b are presented. Similar to the GUI menu 312 (presented in FIG. 3B), processing device view 330 illustrates another example of a GUI menu 334 where different GUI object designation are presented. GUI menu 334 presents GUI object designations for specific computing devices (e.g., "Device 1", "Device 2" and "Device 3"), which may enable users to synchronize different portions of presentation content across different devices and automatically display a variety of presentation content at different times and within different slides.

Processing device view 330 illustrates the execution of user actions 336 and 338, where a user selects specific GUI objects to insert within respective slide-based template 332a and 332b. In the example shown in processing device view 330, a user executes a first user action 336 to select a first GUI object 336a (e.g., "Device 1") from the GUI menu 334 and drops the first GUI object at a first placement position 336b within slide-based template 332a thereby completing the first user action. Further, a user executes a second user action 338 to select a second GUI object 338a (e.g., "Device 3") from the GUI menu 334 and drops the second GUI object at a second placement position 338b within slide-based template 332b thereby completing the second user action.

Figure 3D:
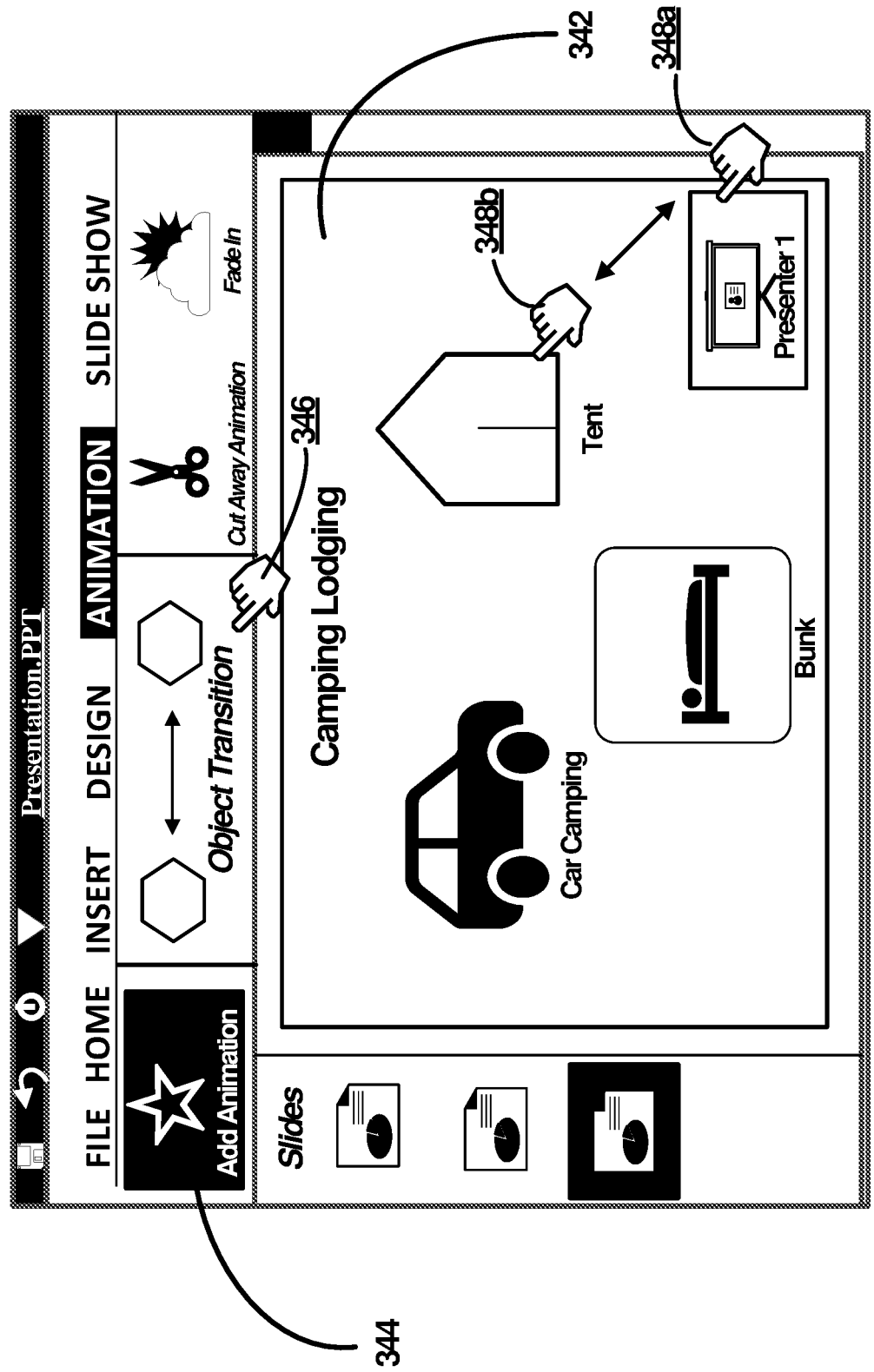

FIG. 3D presents processing device view 340, illustrating a continued example of managing a GUI object within a slide-based template. The example shown in processing device view 340 visually illustrates the creation of a content interaction for a GUI object within a slide-based template. As a non-limiting example, the content interaction is a slide-based animation between a GUI object 348a and a content portion 348b of a slide-based template 342 (e.g., a third slide in a slide-based presentation deck that is being created). An improved GUI of a presentation application or service is configured to provide GUI features that enable users to add animations to GUI objects. For example, a user may select a first GUI feature 344 (e.g., in the application command control) configured to enable animation generation. A user may then select specific GUI sub-features to specifically program an animation involving an exemplary GUI object. For instance, in processing device view 340, a user action 346 is received that select a GUI feature to enable an object transition to be created (e.g., between a GUI object and one or more other content portions of the slide-based template 342). The user may then execute, through a GUI, a subsequent user action that creates a transition between GUI object 348a and content portion 348b.

FIG. 3E presents processing device view 350, illustrating a continued example of managing a GUI object within a slide-based template from that shown in FIG. 3D. For example, processing device view 350 provides a visual representation of a motion animation where a motion of the GUI object (e.g., 348a of FIG. 3D) is animated. The motion begins at an initial positional location 352a of the GUI object and ends at final positional location 352b that ultimately creates an aggregated representation between the GUI object and the content portion (e.g., 348b of FIG. 3D).

FIG. 3F presents processing device view 360, illustrating a continued example of managing a GUI object within a slide-based template. Processing device view 360 illustrates an example of slide-based template 362 where multiple GUI objects are inserted into the slide-based template 362. As shown in processing device view 360, size and positioning of respective GUI objects may be modified upon insertion of respective GUI objects within the slide-based template 362. For instance, a first insertion action 364 occurs modifying a first GUI object to fit within a first content portion, and a second insertion action 366 occurs modifying a second GUI object to fit within a second content portion.

Figure 3G:
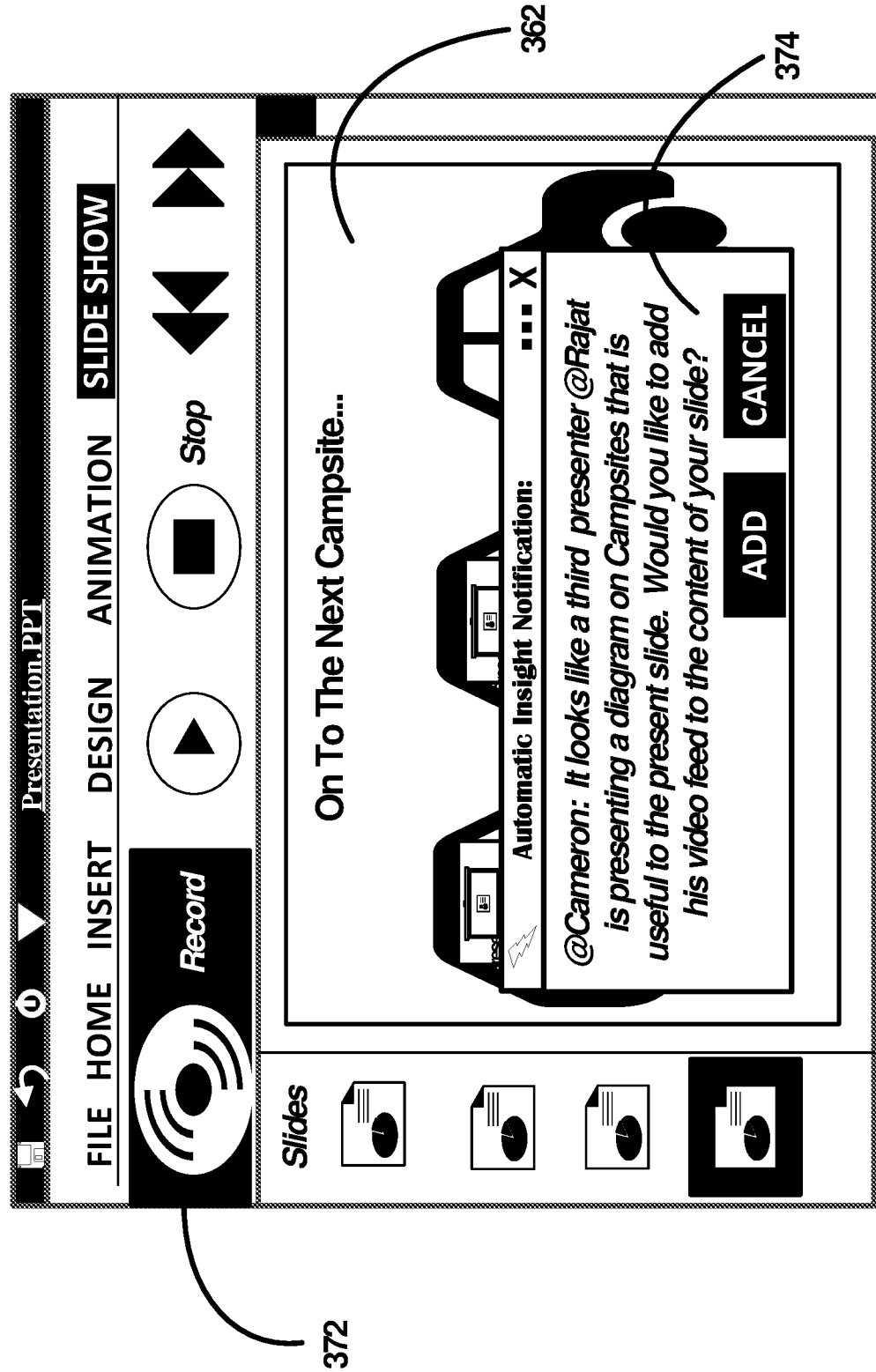

FIG. 3G presents processing device view 370, illustrating a continued example of managing a GUI object within a slide-based template from that shown in FIG. 3F. Processing device view 370 illustrates a technical instance where a user has set the presentation application or service in a presentation mode. As an example, a user has selected a GUI feature 372 to record a presentation of a slide-based presentation deck. In processing device view 370, a user is presenting on a displayed slide that is associated with slide-based template 362 (FIG. 3F). Processing device view 370 provides a front-end representation of processing previously described that relates to automatic generation of data insight suggestions in the form of a GUI notification. As previously described, data insight suggestions related to management of live camera feeds during a presentation (e.g., electronic meeting) may be generated and surfaced to users through a GUI (e.g., as a GUI notification). This may comprise automated generation of data insight suggestions that can be used to recommend inclusion of live camera feeds in a slide-based presentation (e.g., slides thereof).

In the example shown, a GUI notification 374 is automatically surface for a user based on a result of contextual analysis of a user communication (e.g., an electronic meeting) relative to a displayed slide for the slide-based template 362. The GUI notification 374 is a data insight suggestion recommending the inclusion of a live camera feed within a displayed slide. Moreover, the GUI notification 374 further comprises selectable GUI features (e.g., "ADD" and "CANCEL") which may enable a user to automatically add a live camera feed to its displayed slide.

As previously described, a presentation of presentation content, including live camera feeds incorporated therein, can be recorded. This may occur through a presentation application or service or another type of application or service used to conduct a user communication where presentation content is presented. As referenced in the foregoing, an exemplary presentation feed management component (106 of FIG. 1) may be configured to manage recordings of presentation content including automatically recording a presentation of presentation content on behalf of a user and/or providing GUI notifications related to management of recorded presentations. In any example, recording of presentation content may create an electronic file that associates the presentation content (e.g., slide-based templates) with specific live camera feeds that were incorporated (activated) therein during a presentation of the presentation content. The user can go back and review slides (or other types of presentation content) and the associated camera feeds that were activated during presentation of those slides. This may enable users to specifically focus their review on the presentation content (e.g., a slide-based presentation deck) rather than the entirety of what was happening during an electronic meeting with a plurality of live streams being concurrently presented.

Importantly, different versions of presentation content can be maintained (e.g., as a different electronic files). For instance, a user can use the same slide-based presentation deck and present it multiple different times, where different electronic files can be saved with different live camera feeds (e.g., specific to a presentation instance) each time a presentation is run. In further examples, this may also enable users to record a presentation with live camera feeds incorporated therein, recall the same at a later point of time and subsequently distribute that recorded version to other users. In this way, a recording of the live camera feeds (at the time of record) can be played back for users at a later point in time (e.g., not necessarily a live camera feed at the timing of playback).

As identified in the foregoing, the presentation feed management component (106 of FIG. 1) may be configured to manage notification of recorded presentation content automatically executed on behalf of users. As one example, after detecting conclusion of a user communication (e.g., an electronic meeting) a recorded version of presentation content can be automatically saved to a distributed data storage associated with a user account (e.g., of a distributed software platform) and/or a local data storage of a computing device that is used to conduct a presentation. In another example, a GUI notification may be presented after the completion of a presentation (e.g., a predetermined amount of time afterwards) to notify a user of a recorded version of presentation content. In some examples, the presentation feed management component 106 interfaces with the application/service component 104 to provide a GUI notification of a recorded version of presentation content through a GUI that is used to conduct a user communication (e.g., electronic meeting).

Figure 3H:
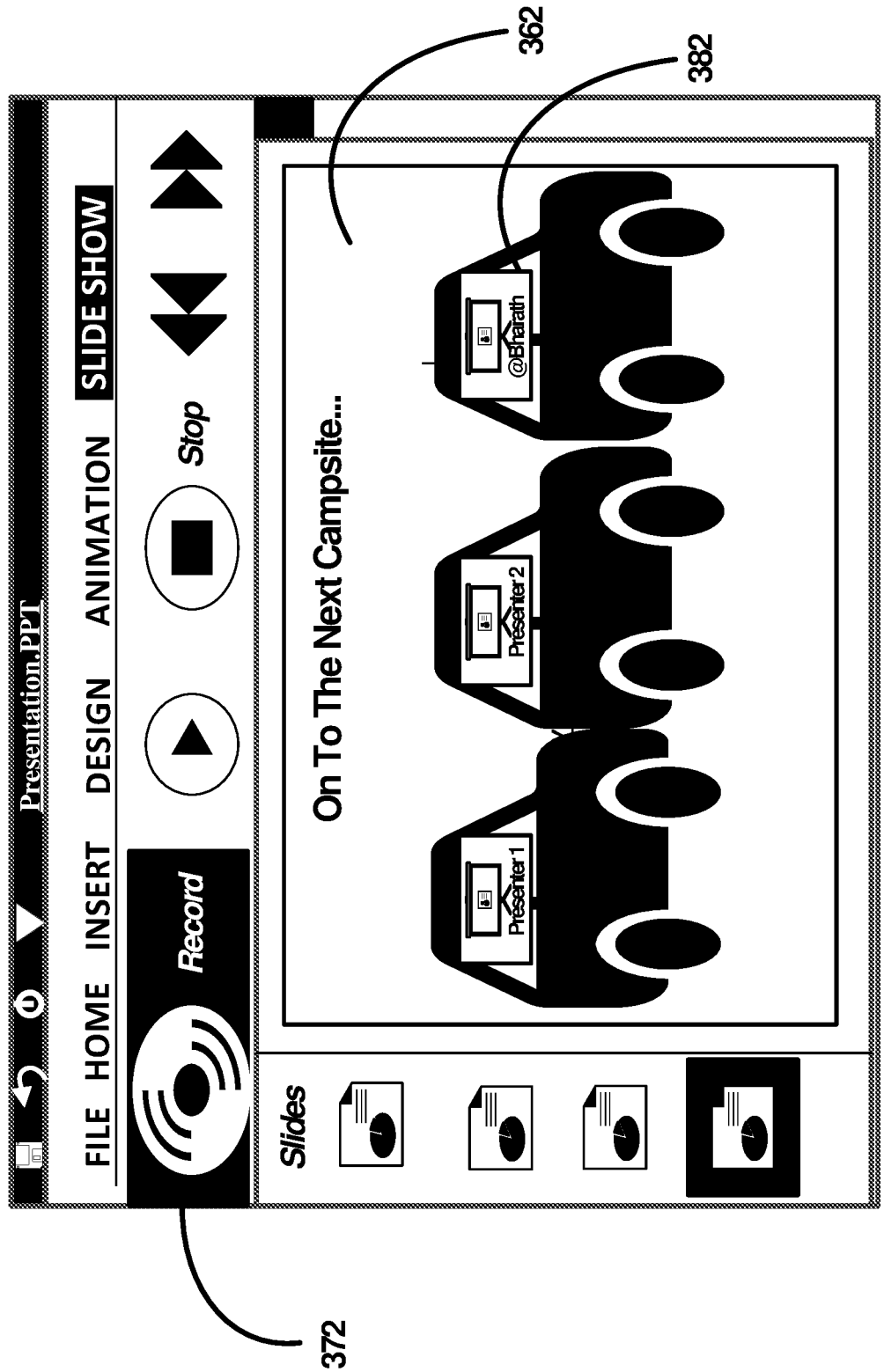

FIG. 3H presents processing device view 380, illustrating a continued example of managing a GUI object within a slide-based template from that shown in FIG. 3G. Processing device view 380 is a visual result of a user selecting GUI notification 374 (FIG. 3G), resulting in a live camera feed 382 being automatically added to its displayed slide. The live camera feed 382 is associated with a GUI object as previously described. As can be seen in processing device view 380, a placement position of the live camera feed 382 may be automatically determined, for example, as a result of contextual analysis of content portions of the displayed slide (e.g., a slide-based template associated therewith). For instance, a trained AI model may be applied to automatically determine a placement position of a GUI object associated with live camera feed 382. In the example shown, a contextual analysis may yield a determination that other GUI objects, associated with the other displayed live camera feeds, are presented within a representation of other content portions (e.g., the cars illustrated within the displayed slide), which ultimately leads to the trained AI model selecting a placement position for the live camera feed 382 that is congruous with the presented slide content including the other displayed live camera feeds.

Figure 3I:
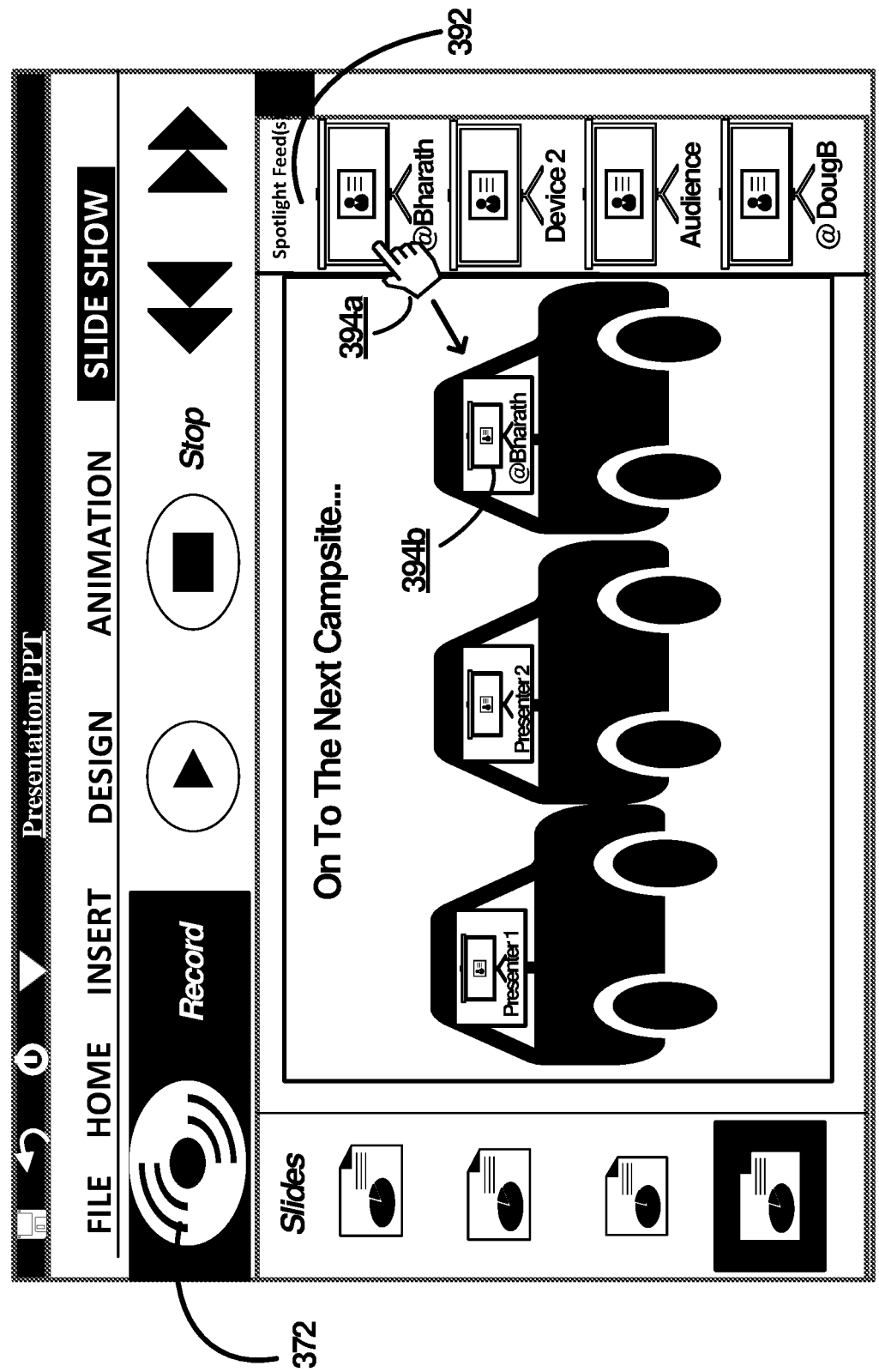

FIG. 3I presents processing device view 390, illustrating a continued example of managing a GUI object within a slide-based template from that shown in FIG. 3F. As shown in FIG. 3F, a user is creating/designing slide-based template 362. Processing device view 390 illustrates another technical instance where a user has set the presentation application or service in a presentation mode. As an example, a user has selected a GUI feature 372 to record a presentation of a slide-based presentation deck, and a displayed slide is presented that corresponds with the slide-based template 362. In processing device view 390, a GUI menu 392, similar to that shown in previous design/creation examples (e.g., FIGS. 3B and 3C), is automatically presented for a user during the presentation of its slide-based presentation deck. The GUI menu 392 may reflect result of back-end processing of a trained AI model that is configured to contextually analysis signal data associated with a presentation of presentation content, for example, relative to a current context of a user communication (e.g., presentation of slide-based content in an electronic meeting). In instances where a user communication is an electronic meeting and presentation content is a slide-based presentation deck, a current context of a user communication may be a specific slide that is currently being presented. As shown in processing device view 390, GUI menu 392 presents GUI objects having contextually relevant designations (e.g., "@Bharath", "audience", "@DougB") to the current context.

During the presentation, a user may then execute a user action 394 selecting a GUI object 394a (e.g., "@Bharath") from the GUI menu 392 and dropping the GUI object at a placement position 394b within a displayed slide thereby completing the user action 394. This action automatically adds a live camera feed to a displayed slide in real-time enabling a user to dynamically update a presentation to include live camera feeds as a context of a presentation dynamically changes. While not illustrated, it should be recognized that GUI functionality may also be presented that enables users to remove (or hide) live camera feeds from a displayed slide. For instance, a user may be presenting a business presentation remotely (e.g., at home) and be interrupted by a family member, where the user may wish to temporarily hide or minimize its live camera feed. In some technical examples, this may occur through control over a presentation via an additional computing device (e.g., mobile computing device, presentation control device).

FIG. 4 illustrates a computing system 401 suitable for implementing processing operations described herein related to management of live feeds within slide-based presentations, with which aspects of the present disclosure may be practiced. As referenced above, computing system 401 may be configured to implement processing operations of any component described herein including exemplary presentation feed management component(s) previously described (e.g., presentation feed management component(s) 106 of FIG. 1). As such, computing system 401 may be configured as a specific purpose computing device that executes specific processing operations to solve the technical problems described herein including those pertaining to management of live camera feeds within slide-based presentation as well as generation of data insight suggestions for managing live camera feeds during a presentation of content (e.g., slide-based content). Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more applications or services. Computing system 401 may comprise a collection of devices executing processing for front-end applications/services, back-end applications/services or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, smart computing devices including television devices and wearable computing devices including VR devices and AR devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 may be connected to other computing devices (e.g., display device, audio devices, servers, mobile/remote devices, VR devices, AR devices, etc.) to further enable processing operations to be executed. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute system diagram 100 (FIG. 1), method 200 (FIG. 2A), method 250 (FIG. 2B) and/or the accompanying description of FIGS. 3A-3I.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices, VR devices, AR devices as well as any other type of processing devices, combinations, or variations thereof.

Storage system 403 may comprise any computer readable storage media readable by processing system 402 and capable of storing software 405. Storage system 403 may include volatile and nonvolatile, removable, and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing one or more presentation feed management component(s) 406a as described herein. Software 405 may further comprise application/service component(s) 406b that provide applications/services as described in the foregoing description such as applications/services that enable access to presentation content (and templates thereof) including slide-based presentation applications/services and collaborative communication applications/services usable to enable users to conduct electronic meetings, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to execute specific processing components described herein as well as process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including rendering of: GUI objects configured to enable activation of live camera feeds; editing of GUI objects configured to enable activation of live camera feeds; GUI elements (including GUI menus) and application command control features configured to enable management of exemplary GUI objects in conjunction with presentation content (e.g., slide-based presentations); notifications of data insights including data insight suggestions for management of live camera feeds during presentation of content; contextual representations (e.g., user-specific and/or communication-specific) of data insights including exemplary data insight suggestions; and GUI elements for management of recording and playback of presentation content that comprises live camera feeds, among other examples. User interface system 409 comprises a graphical user interface that presents graphical user interface elements representative of any point in the processing described in the foregoing description including processing operations described in system diagram 100 (FIG. 1), method 200 (FIG. 2A), method 250 (FIG. 2B) and front-end representations related to the description of FIGS. 3A-3I. A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., audio output, handwritten input) in conjunction with operation of exemplary applications/services (e.g., a collaborative communication application/service, electronic meeting application/service, etc.) described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
   providing, for display in a graphical user interface (GUI), a slide-based presentation that comprises a plurality of slides;
   detecting access to a slide of the slide-based presentation that comprises, within the slide, a GUI object configured to activate a live camera feed;
   in response to detecting the access to the slide, applying a trained artificial intelligence (AI) model to the live camera feed, the trained AI model configured to automatically generate a representation of the live camera feed that is tailored for the slide, wherein the trained AI model, in generating the representation of the live camera feed, is configured to execute processing operations that edit the live camera feed to generate an edited live camera feed for presentation within the slide; and
   providing the edited live camera feed for display within the slide.

2. The computer-implemented method of claim 1, wherein the processing operations that edit the live camera feed comprises:
   removing a background associated with the live camera feed.

3. The computer-implemented method of claim 1, wherein the processing operations that edit the live camera feed comprises:
   analyzing slide content portions of the slide and slide content interactions associated with the slide content portions; and
   automatically formatting the live camera feed based on a result of analyzing the slide content portions and the slide content interactions.

4. The computer-implemented method of claim 3, wherein the automatically formatting comprises automatically modifying a size of the live camera feed.

5. The computer-implemented method of claim 3, wherein the automatically formatting comprises automatically modifying a layout of the live camera feed.

6. The computer-implemented method of claim 3, wherein the automatically formatting comprises automatically modifying a layering of the live camera feed.

7. The computer-implemented method of claim 3, wherein the automatically formatting comprises automatically formatting the live camera feed on a frame-by-frame basis.

8. The computer-implemented method of claim 1, wherein the slide comprises a second GUI object configured to activate a second live camera feed, the method further comprising:
   in response to detecting the access to the slide, applying the trained AI model to the second live camera feed.

9. The computer-implemented method of claim 1, further comprising:
   applying a second trained AI model configured to generate data insight suggestions, wherein the second trained AI model, in generating the data insight suggestions, is configured to execute processing operations that generate suggestions related to management of the live camera feed.

10. The computer-implemented method of claim 9, wherein the processing operations that generate suggestions related to management of the live camera feed comprise:
    analyze a relevance of contextual data signal collected during the slide-based presentation;
    generate a suggestion to add a second live camera feed to the slide; and
    transmit, for display on a device of a presenter of the slide, the suggestion to the device.

11. The computer-implemented method of claim 10, further comprising:
    receive an indication to accept the suggestion; and
    add the second live camera feed to the slide.

12. The computer-implemented method of claim 10, wherein the device of the presenter is a first device of the presenter and wherein the presenter is presenting the slide from a second device.

13. A system comprising:
    at least one processor; and
    a memory, operatively connected with the at least one processor, storing computer-executable instructions that, when executed by the at least one processor, causes the at least one processor to:
    provide, for display in a graphical user interface (GUI), a slide-based presentation that comprises a plurality of slides;
    detect access to a slide of the slide-based presentation that comprises, within the slide, a GUI object configured to activate a live camera feed;
    in response to detecting the access to the slide, apply a trained artificial intelligence (AI) model to the live camera feed, the trained AI model configured to automatically generate a representation of the live camera feed that is tailored for the slide, wherein the trained AI model, in generating the representation of the live camera feed, is configured to execute processing operations that edit the live camera feed to generate an edited live camera feed for presentation within the slide; and provide the edited live camera feed for display within the slide.

14. The system of claim 13, wherein the processing operations that edit the live camera feed comprises:

removing a background associated with the live camera feed.

15. The system of claim 13, wherein the processing operations that edit the live camera feed comprises:

analyzing slide content portions of the slide and slide content interactions associated with the slide content portions; and automatically formatting the live camera feed based on a result of analyzing the slide content portions and the slide content interactions.

16. The system of claim 15, wherein the automatically formatting comprises at least one of automatically modifying a size of the live camera feed, automatically modifying a layout of the live camera feed, automatically modifying a layering of the live camera feed, and automatically formatting the live camera feed on a frame-by-frame basis.

17. The system of claim 13, wherein the slide comprises a second GUI object configured to activate a second live camera feed, and wherein the computer-executable instructions further cause the at least one processor to:

in response to detecting the access to the slide, apply the trained AI model to the second live camera feed.

18. The system of claim 13, wherein the computer-executable instructions further cause the at least one processor to:

apply a second trained AI model configured to generate data insight suggestions, wherein the second trained AI model, in generating the data insight suggestions, is configured to execute processing operations that generate suggestions related to management of the live camera feed.

19. The system of claim 18, wherein the processing operations that generate suggestions related to management of the live camera feed comprise:

analyze a relevance of contextual data signal collected during the slide-based presentation;

generate a suggestion to add a second live camera feed to the slide; and transmit, for display on a device of a presenter of the slide, the suggestion to the device.

20. The system of claim 19, wherein the computer-executable instructions further cause the at least one processor to:

receive an indication to accept the suggestion; and add the second live camera feed to the slide.

* * * * *